(12) United States Patent
Nakagaki et al.

(10) Patent No.: US 12,531,389 B2
(45) Date of Patent: Jan. 20, 2026

(54) LIGHT EMITTING DEVICE AND METHOD FOR MANUFACTURING LIGHT EMITTING DEVICE

(71) Applicant: NICHIA CORPORATION, Anan (JP)

(72) Inventors: Masatoshi Nakagaki, Komatsushima (JP); Tadaaki Miyata, Yokohama (JP); Yoshihiro Kimura, Yokohama (JP)

(73) Assignee: NICHIA CORPORATION, Anan (JP)

( * ) Notice: Subject to any disclaimer, the term of this patent is extended or adjusted under 35 U.S.C. 154(b) by 813 days.

(21) Appl. No.: 17/750,732

(22) Filed: May 23, 2022

(65) Prior Publication Data

US 2022/0376466 A1    Nov. 24, 2022

(30) Foreign Application Priority Data

May 24, 2021  (JP) ................. 2021-087054

(51) Int. Cl.
*H01S 5/02315*  (2021.01)
*H01S 5/02345*  (2021.01)
*H01S 5/02355*  (2021.01)

(52) U.S. Cl.
CPC ...... *H01S 5/02315* (2021.01); *H01S 5/02345* (2021.01); *H01S 5/02355* (2021.01)

(58) Field of Classification Search
CPC .. H01S 5/0236; H01S 5/02355; H01S 5/0237; H01S 5/023; H01S 5/02315
See application file for complete search history.

(56) References Cited

U.S. PATENT DOCUMENTS

| | | | | |
|---|---|---|---|---|
| 3,780,795 | A * | 12/1973 | Arnold | H01L 23/4006 165/185 |
| 5,099,488 | A * | 3/1992 | Ahrabi | H01S 5/4025 372/50.12 |
| 5,195,102 | A * | 3/1993 | McLean | H01S 5/02216 372/36 |
| 6,084,895 | A * | 7/2000 | Kouchi | H01S 5/0235 372/50.1 |
| 7,569,929 | B2 * | 8/2009 | Mori | H01L 23/367 257/706 |

(Continued)

FOREIGN PATENT DOCUMENTS

| | | | | |
|---|---|---|---|---|
| JP | 2000260915 | A | * 9/2000 | |
| JP | 2003068929 | A | * 3/2003 | H01L 24/48 |

(Continued)

*Primary Examiner* — Joshua King
(74) *Attorney, Agent, or Firm* — Foley & Lardner LLP

(57) ABSTRACT

A light emitting device includes: at least one semiconductor laser element; a submount; and a base portion having a mounting surface. The submount includes: a first lateral face being located at a side of an exiting lateral surface of the semiconductor laser element, the first lateral face intersecting the upper face of the submount, and the first lateral face being above and separated from the mounting surface; a lower face being set back inside of the submount relative to an edge at which the upper face and the first lateral face intersect in a top view; and a second lateral face being located at the same side as the first lateral face and intersecting the lower face. A portion of a bonding material protrudes from the lower face and extends outward of an edge at which the lower face and the second lateral face intersect.

16 Claims, 13 Drawing Sheets

(56) References Cited

U.S. PATENT DOCUMENTS

| | | | |
|---|---|---|---|
| 7,632,716 B2* | 12/2009 | Muraki | H01L 23/66 |
| | | | 257/E23.101 |
| 10,622,783 B1* | 4/2020 | Hosoi | H01S 5/0233 |
| 10,732,265 B1* | 8/2020 | Parameswaran | H01S 3/2308 |
| 11,057,112 B1* | 7/2021 | Lin | H04B 10/67 |
| 2003/0107114 A1* | 6/2003 | Lam | H01S 5/02415 |
| | | | 257/675 |
| 2004/0201029 A1* | 10/2004 | Yamane | H01S 5/0237 |
| | | | 257/99 |
| 2007/0069231 A1* | 3/2007 | Namioka | H10H 20/8582 |
| | | | 257/E33.072 |
| 2008/0128896 A1* | 6/2008 | Toh | H01L 23/473 |
| | | | 257/E23.101 |
| 2008/0157347 A1* | 7/2008 | Takashima | H01S 5/02492 |
| | | | 257/E23.101 |
| 2008/0192206 A1* | 8/2008 | Takagi | G09G 3/02 |
| | | | 372/36 |
| 2011/0007762 A1 | 1/2011 | Fukuda et al. | |
| 2011/0026558 A1* | 2/2011 | Raju | G02B 6/423 |
| | | | 372/50.1 |
| 2011/0090927 A1* | 4/2011 | Wong | H01L 23/3735 |
| | | | 257/E23.08 |
| 2011/0134948 A1 | 6/2011 | Kawakami et al. | |
| 2011/0188532 A1* | 8/2011 | Hata | H01S 5/02375 |
| | | | 372/50.12 |
| 2012/0195545 A1* | 8/2012 | Yasuda | H10F 77/50 |
| | | | 438/66 |
| 2012/0263200 A1* | 10/2012 | Tamaya | H01S 5/02476 |
| | | | 372/36 |
| 2014/0233598 A1* | 8/2014 | Tamaya | H01S 3/0632 |
| | | | 372/75 |
| 2014/0240952 A1* | 8/2014 | Nakanishi | H01S 5/02253 |
| | | | 29/25.01 |
| 2014/0334508 A1* | 11/2014 | Lauer | H01S 5/024 |
| | | | 372/36 |
| 2016/0254639 A1* | 9/2016 | Watanabe | H01S 5/4025 |
| | | | 372/36 |
| 2016/0284664 A1* | 9/2016 | Hohlfeld | C04B 37/021 |
| 2018/0040792 A1* | 2/2018 | Kawabata | H05K 7/20463 |
| 2018/0090908 A1 | 3/2018 | Enzmann et al. | |
| 2018/0138657 A1* | 5/2018 | Miura | H01S 5/0235 |
| 2018/0278020 A1 | 9/2018 | Nakajima et al. | |
| 2019/0036298 A1* | 1/2019 | Fujimura | H01S 5/0237 |
| 2019/0067161 A1* | 2/2019 | Kaifuchi | H01S 5/02476 |
| 2019/0280460 A1* | 9/2019 | Ito | H01S 5/02257 |
| 2020/0176948 A1* | 6/2020 | Wojcik | H01S 5/02345 |
| 2020/0295533 A1* | 9/2020 | Bachmann | H01S 5/02461 |
| 2021/0057876 A1* | 2/2021 | Yoneda | H01S 5/022 |
| 2021/0091532 A1 | 3/2021 | Miyata et al. | |
| 2021/0159663 A1* | 5/2021 | Samonji | H01S 5/02476 |
| 2021/0296851 A1* | 9/2021 | Hagino | H01S 5/4087 |
| 2022/0013429 A1* | 1/2022 | Miyata | H01L 23/13 |
| 2022/0037851 A1* | 2/2022 | Iwai | H01S 5/0234 |

FOREIGN PATENT DOCUMENTS

| | | | | |
|---|---|---|---|---|
| JP | 2004047748 A | * | 2/2004 | H10H 20/835 |
| JP | 2005-317594 A | | 11/2005 | |
| JP | 2005-332983 A | | 12/2005 | |
| JP | 2007-073550 A | | 3/2007 | |
| JP | 2007-096079 A | | 4/2007 | |
| JP | 2007-110032 A | | 4/2007 | |
| JP | 2007-324275 A | | 12/2007 | |
| JP | 2008-166579 A | | 7/2008 | |
| JP | 2009224382 A | * | 10/2009 | |
| JP | 2010206090 A | * | 9/2010 | |
| JP | 2011077192 A | * | 4/2011 | |
| JP | 2011-119521 A | | 6/2011 | |
| JP | 2012-160527 A | | 8/2012 | |
| JP | 2014-175565 A | | 9/2014 | |
| JP | 2018-515916 A | | 6/2018 | |
| JP | 2018-160520 A | | 10/2018 | |
| JP | 2019075460 A | * | 5/2019 | H01S 5/0238 |
| JP | 2019-165119 A | | 9/2019 | |
| JP | 2021-044468 A | | 3/2021 | |
| JP | 2021-052157 A | | 4/2021 | |
| WO | WO-2009113180 A1 | * | 9/2009 | H01S 5/4031 |
| WO | WO-2020031944 A1 | * | 2/2020 | H01S 5/04256 |
| WO | WO-2020144794 A1 | * | 7/2020 | H01S 5/4087 |
| WO | WO-2021256421 A1 | * | 12/2021 | H10H 20/8312 |
| WO | WO-2023017632 A1 | * | 2/2023 | H01S 5/02212 |

* cited by examiner

LIGHT EMITTING DEVICE AND METHOD FOR MANUFACTURING LIGHT EMITTING DEVICE

CROSS-REFERENCE TO RELATED APPLICATION

This application claims priority to Japanese Patent Application No. 2021-087054, filed on May 24, 2021, the disclosure of which is hereby incorporated by reference in its entirety.

BACKGROUND

The present disclosure relates to a light emitting device and a method for manufacturing a light emitting device.

Light emission apparatuses are known in which multiple component elements are mounted within the package. Such multiple component elements may include one or more light-emitting elements, a submount, and a substrate, for example. For instance, Japanese Patent Publication No. 2019-165119 discloses a semiconductor laser module that includes one semiconductor laser element, a submount, an electrically conductive portion, and a substrate. On the substrate, a groove is provided that is recessed downward from an edge of a region in which the submount is disposed. This groove restrains any solder that has protruded from the region in which the submount is disposed from creeping up. This reduces the possibility of a malfunction.

SUMMARY

Certain embodiments of the present disclosure provide a small light emitting device.

In an illustrative and non-limiting embodiment, a light emitting device according to the present disclosure includes: at least one semiconductor laser element having an exiting lateral surface through which laser light is emitted; a submount having an upper face on which the at least one semiconductor laser element is disposed; and a base portion having a mounting surface to which the submount is fixed, the submount including: a first lateral face being located at a side of the exiting lateral surface of the at least one semiconductor laser element, the first lateral face intersecting the upper face, and the first lateral face being above and separated from the mounting surface; a lower face bonded to the mounting surface of the base portion, the lower face being set back inside of the submount relative to an edge at which the upper face and the first lateral face intersect in a top view as viewed from a direction to the upper face; and a second lateral face being located at the same side as the first lateral face and intersecting the lower face, wherein, a bonding material forms a bonding layer between the mounting surface of the base portion and the lower face of the submount; and a portion of the bonding material protrudes from the lower face and extends outward of an edge at which the lower face and the second lateral face intersect.

In an illustrative and non-limiting embodiment, a method for manufacturing a light emitting device according to the present disclosure is a method for manufacturing a light emitting device that includes a submount having an upper face on which at least one semiconductor laser element is disposed and a base portion having a mounting surface to which the submount is fixed, the method including: making one or more recesses at an outer periphery of the upper face of the submount; forming a first wiring region in the upper face of the submount; forming a second wiring region in the mounting surface of the base portion; applying a paste material to the mounting surface of the base portion and/or a lower face of the submount; sintering the paste material to form a bonding layer between the mounting surface of the base portion and the lower face of the submount and to bond the submount to the mounting surface of the base portion; and sintering an electrically conductive paste material to form one or more electrically conductive members that are in contact with the one or more recesses made at the outer periphery of the upper face of the submount and to electrically connect the first wiring region formed in the upper face of the submount and the second wiring region formed in the mounting surface of the base portion.

According to certain embodiments of the present disclosure, a small light emitting device can be provided.

DETAILED DESCRIPTION

Figure 1:
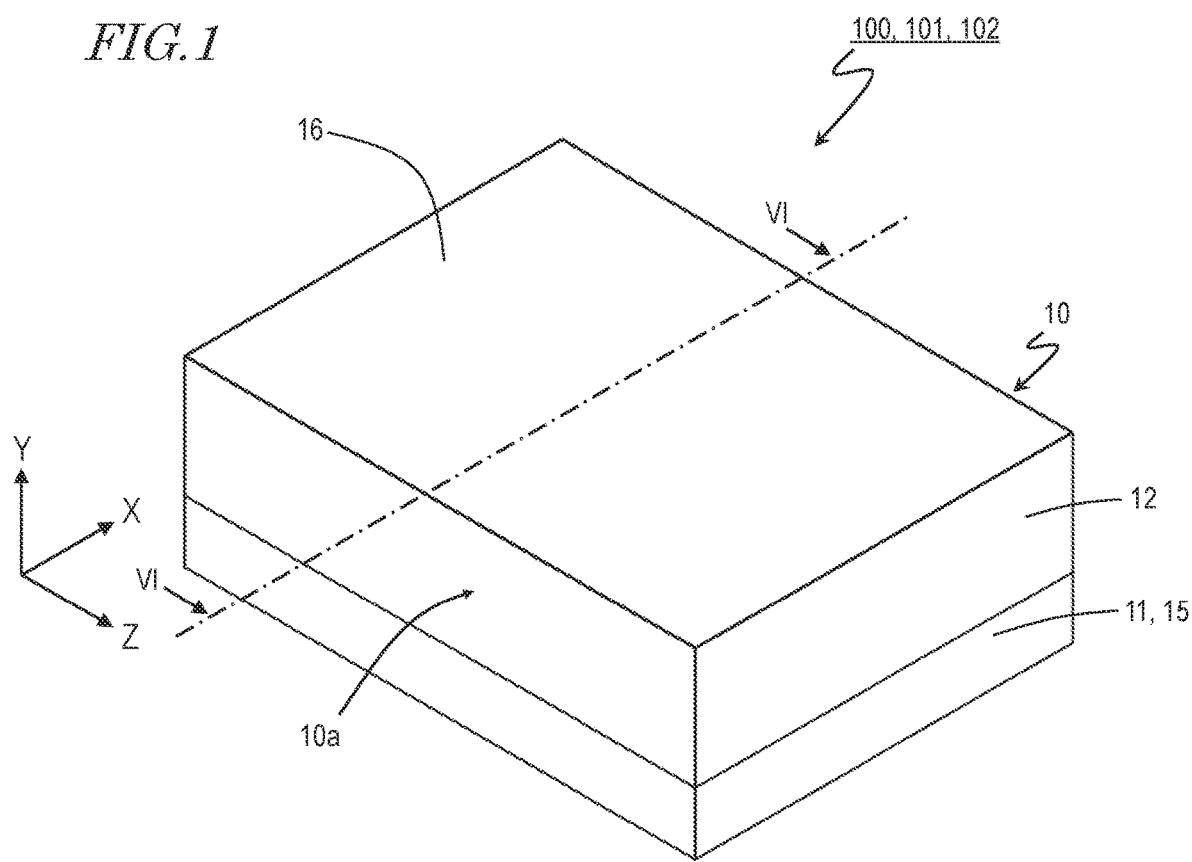
FIG. 1 is a perspective view of a light emitting device according to each embodiment of the present disclosure.

In the specification and claims herein, a polygonal shape, such as a triangle, quadrangle, or the like, is not limited to the polygonal shape in a mathematically strict sense, and includes any of those shapes subjected to processing such as cutting angles, chamfering, beveling, rounding, or the like. Similarly, a polygonal shape subjected to processing not only at a corner (end of a side), but also in the middle of a side will also be referred to as a polygonal shape. In other words, any polygon-based shape subjected to processing is encompassed by the term "polygon" in the specification and the claims herein.

This applies to not only polygons, but also any word that describes a specific shape, such as a trapezoidal, circular, recessed, or projected shape. This also applies when describing each side of a shape. In other words, even if a side is subjected to processing at a corner or at a portion between the corner, the "side" includes the processed portion. In the case of distinguishing a "polygon" or "side" that has not been processed from a processed shape, it will be expressed with the word "strict sense" added thereto, for example, a "strict sense quadrangle."

In the specification and claims herein, moreover, when there are multiple pieces of a certain component and a distinction must be made, an ordinal such as "first," "second," or the like might occasionally be added. For example, a claim may recite that "a light emitting element is disposed on a substrate," while the specification may state that "a first light emitting element and a second light emitting element are disposed on a substrate." The ordinals, such as "first" and "second," are merely used to distinguish two light emitting elements. There is no special meaning associated with the order of the ordinals. An element accompanied by the same ordinal might not refer to the same element between the specification and the claims. For example, in the case in which elements are specified by the words, "a first light emitting element," "a second light emitting element," and "a third light emitting element," in the specification, "a first light emitting element" and "a second light emitting element" recited in the claims might correspond to "a first light emitting element" and "a third light emitting element" in the specification. Furthermore, in the case in which the term, "a first light emitting element," is used, but the term, "a second light emitting element," is not used in claim 1, the invention according to claim 1 is sufficient if it includes one light emitting element, and the light emitting element is not limited to "a first light emitting element" as used in the specification; i.e., it can be "a second light emitting element" or "a third light emitting element" in the specification.

In the specification and claims herein, terms indicating directions or positions (e.g., "upper/upward," "lower/downward," "right/rightward," "left/leftward," "front," "rear," and other terms including these) might be used. These terms, however, are merely used for the purpose of making the relative directions or positions in the drawings being referenced more easily understood. As long as the relative relationship between the directions or the positions indicated with the terms such as "upper," "lower," or the like is the same as those in a referenced drawing, the absolute layout of the elements in drawings outside of the present disclosure, or actual products and manufacturing equipment outside of the present disclosure, does not have to be the same as that shown in the referenced drawing.

Note that the dimensions, dimensional ratio, shapes, spacing of arrangement, etc. of any component elements shown in a drawing may be exaggerated for ease of understanding. In order to avoid excessive complexity of the drawings, certain elements may be omitted from illustration.

Hereinafter, with reference to the drawings, embodiments of the present invention will be described. Although the embodiments illustrate specific implementations of the technological concepts of the present invention, the present invention is not limited to the described embodiments. The numerical values, shapes, materials, and the order of processing steps shown in the description of the embodiments are only examples, and various modifications are possible so long as there is no technical contradiction. In the following description, elements identified by the same name or reference numerals are the same or the same type of elements, and redundant explanations of those elements may be omitted.

First Embodiment

With reference to FIG. 1 to FIG. 11, a light emitting device 100 according to a first embodiment will be described.

Figure 2:
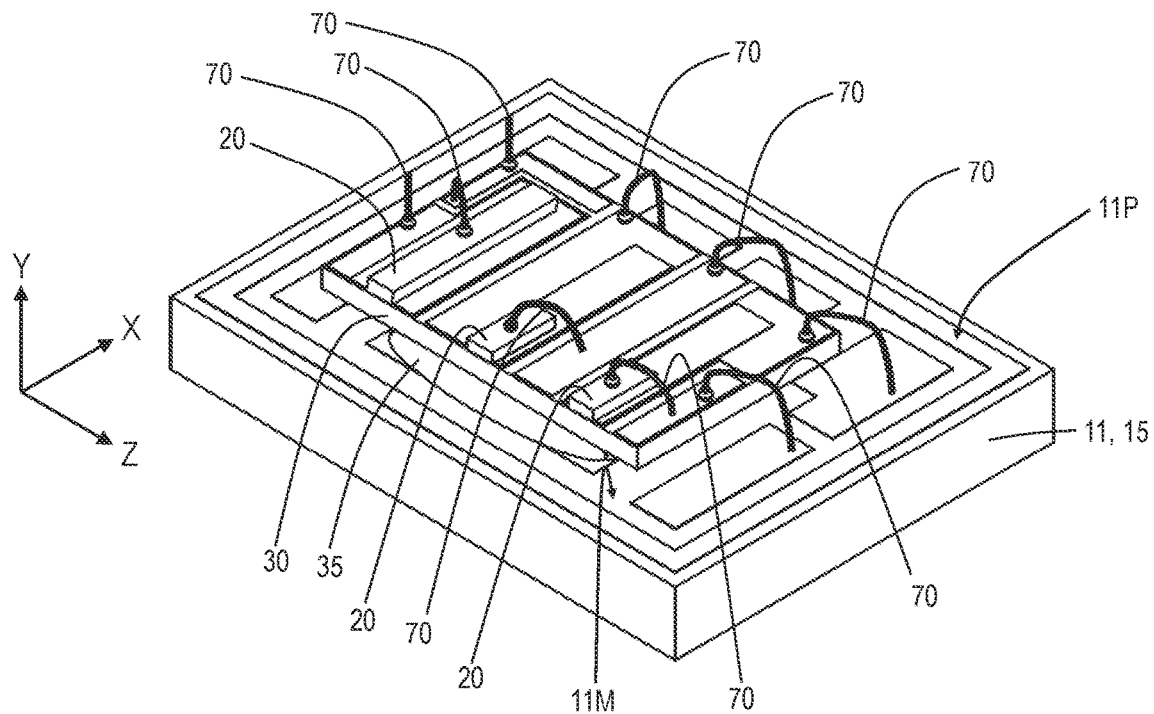
FIG. 2 is a perspective view of the light emitting device according to a first embodiment of the present disclosure, from which a cap of a package is omitted.
Figure 3:
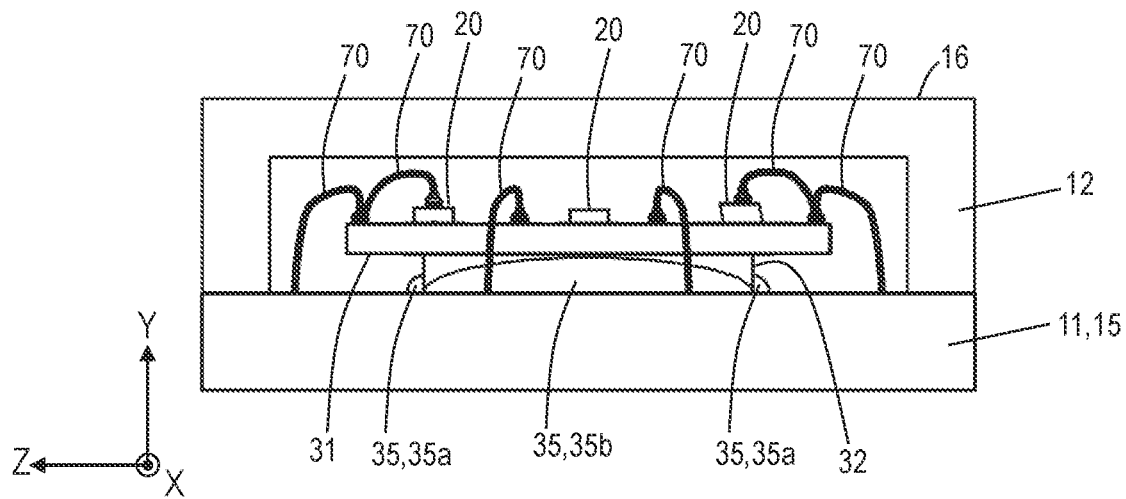
FIG. 3 is a rear view of the light emitting device according to the first embodiment of the present disclosure, as viewed from the positive direction of the X axis in the figure.
Figure 4:
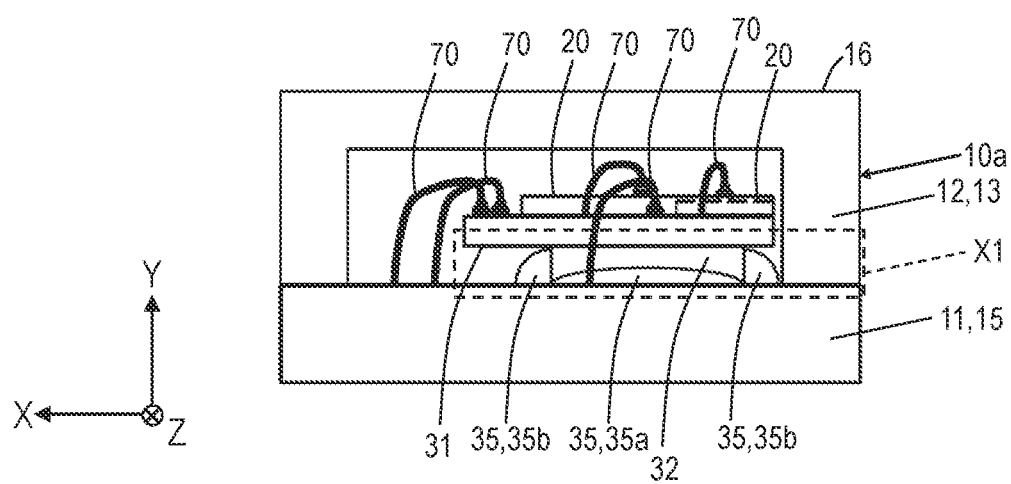
FIG. 4 is a side view of the light emitting device according to the first embodiment of the present disclosure, as viewed from the negative direction of the Z axis in the figure.
Figure 5:
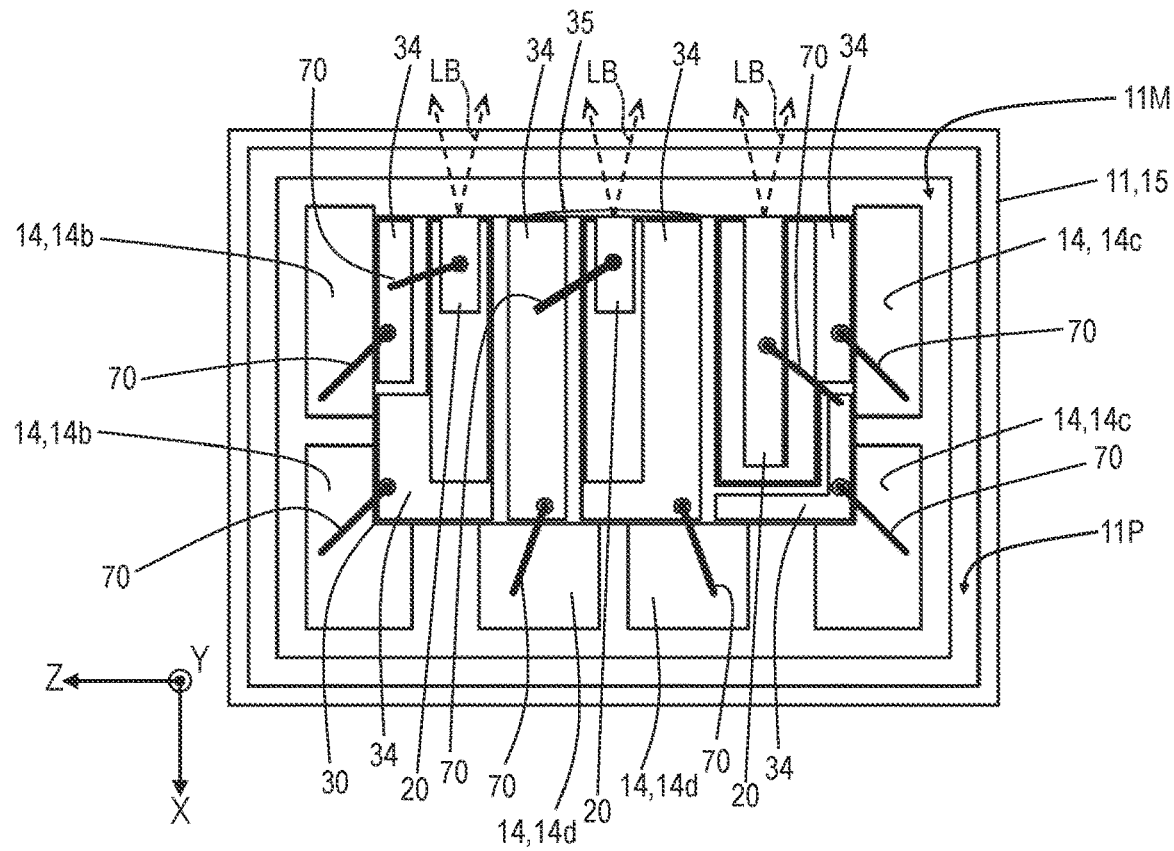
FIG. 5 is a top view of the light emitting device according to the first embodiment of the present disclosure, from which the cap of the package is omitted.
Figure 6:
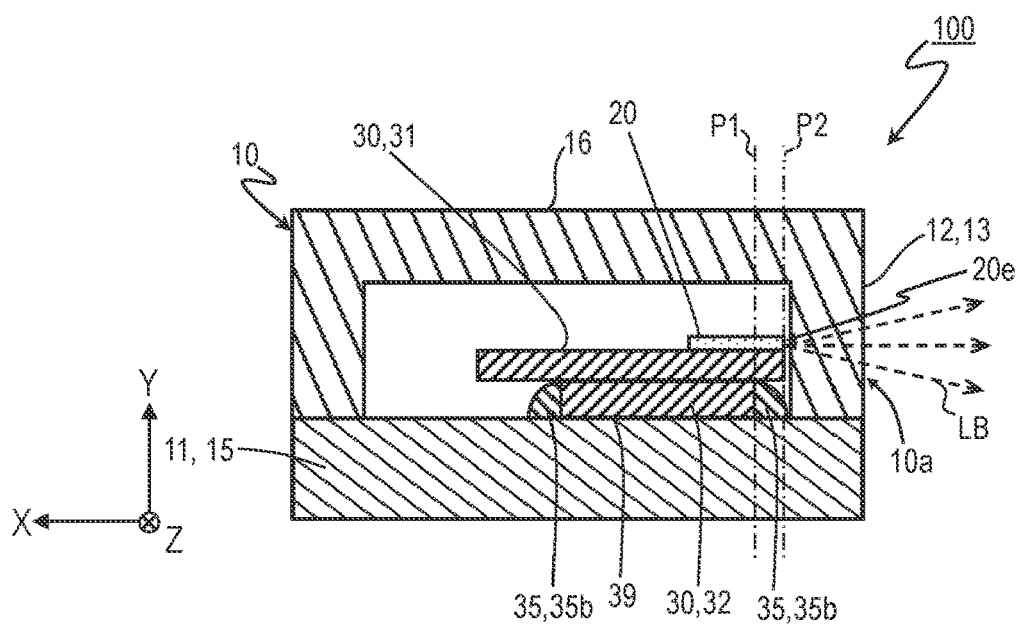
FIG. 6 is a cross-sectional view along cross-sectional line VI-VI in FIG. 1.
Figure 7:
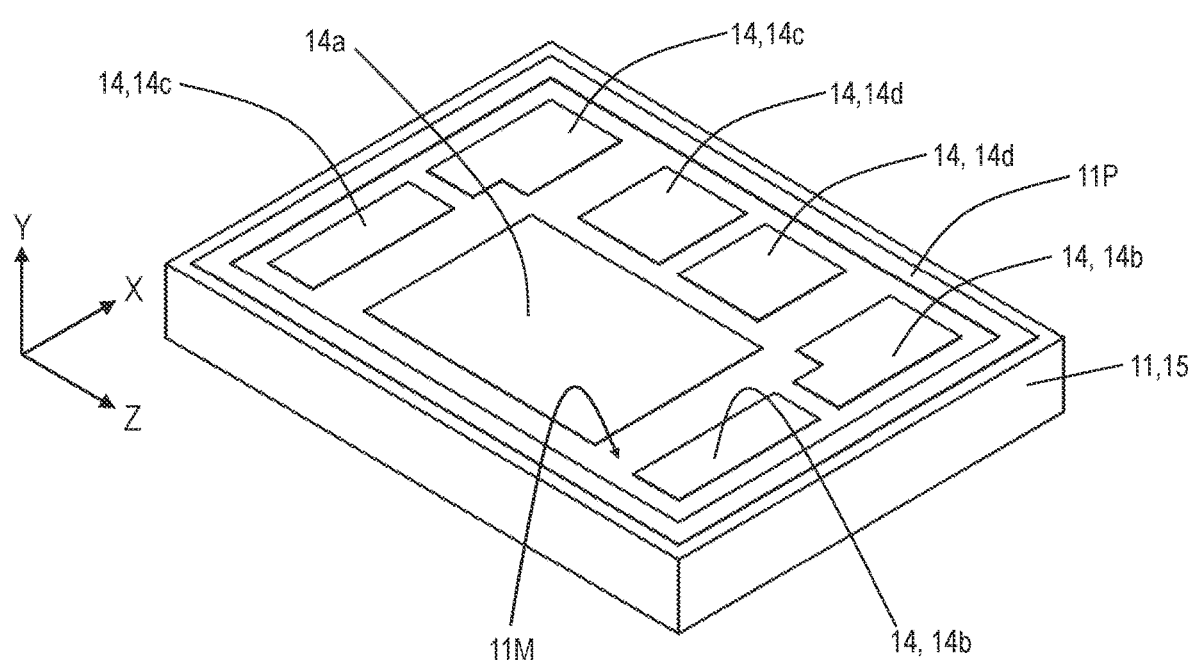
FIG. 7 is a perspective view of a base portion according to the first embodiment of the present disclosure.
Figure 8:
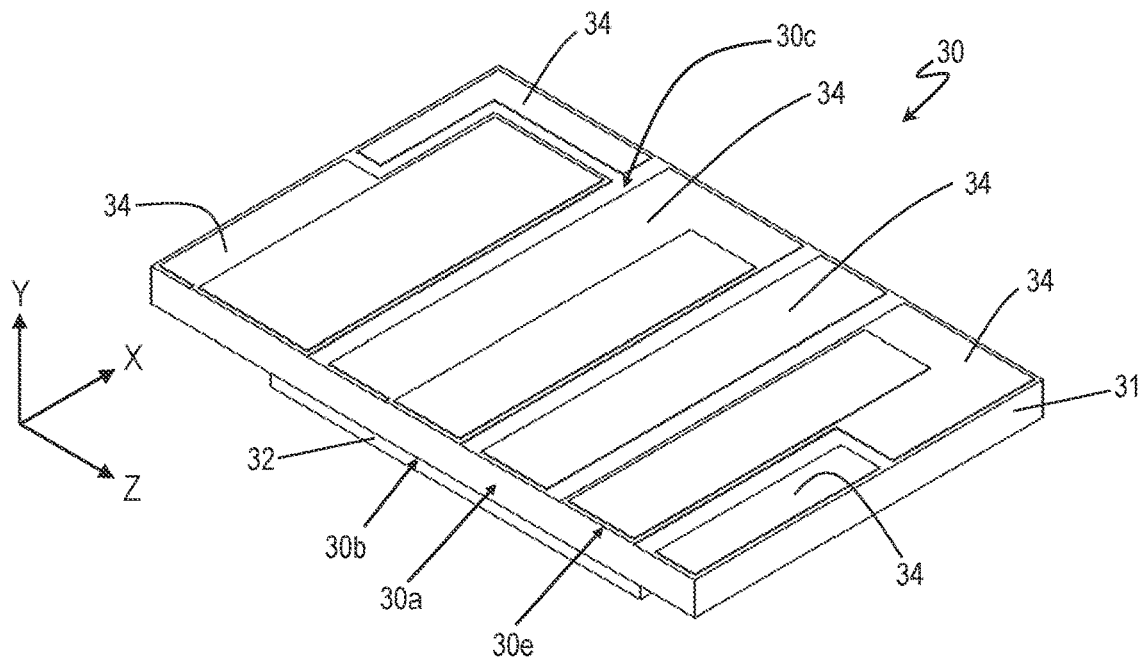
FIG. 8 is a perspective view of a submount according to the first embodiment of the present disclosure.
Figure 9A:
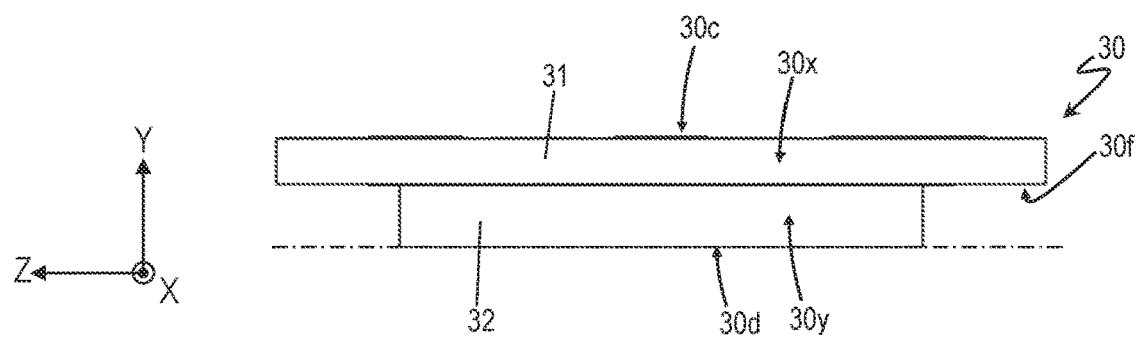
FIG. 9A is a rear view of the submount according to the first embodiment of the present disclosure, as viewed from the positive direction of the X axis in the figure.
Figure 9B:
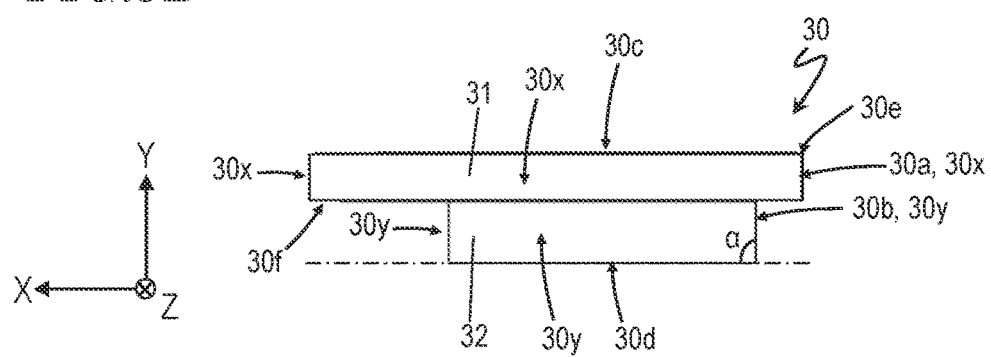
FIG. 9B is a side view of the submount the first embodiment of the present disclosure, as viewed from the negative direction of the Z axis in the figure.
Figure 10:
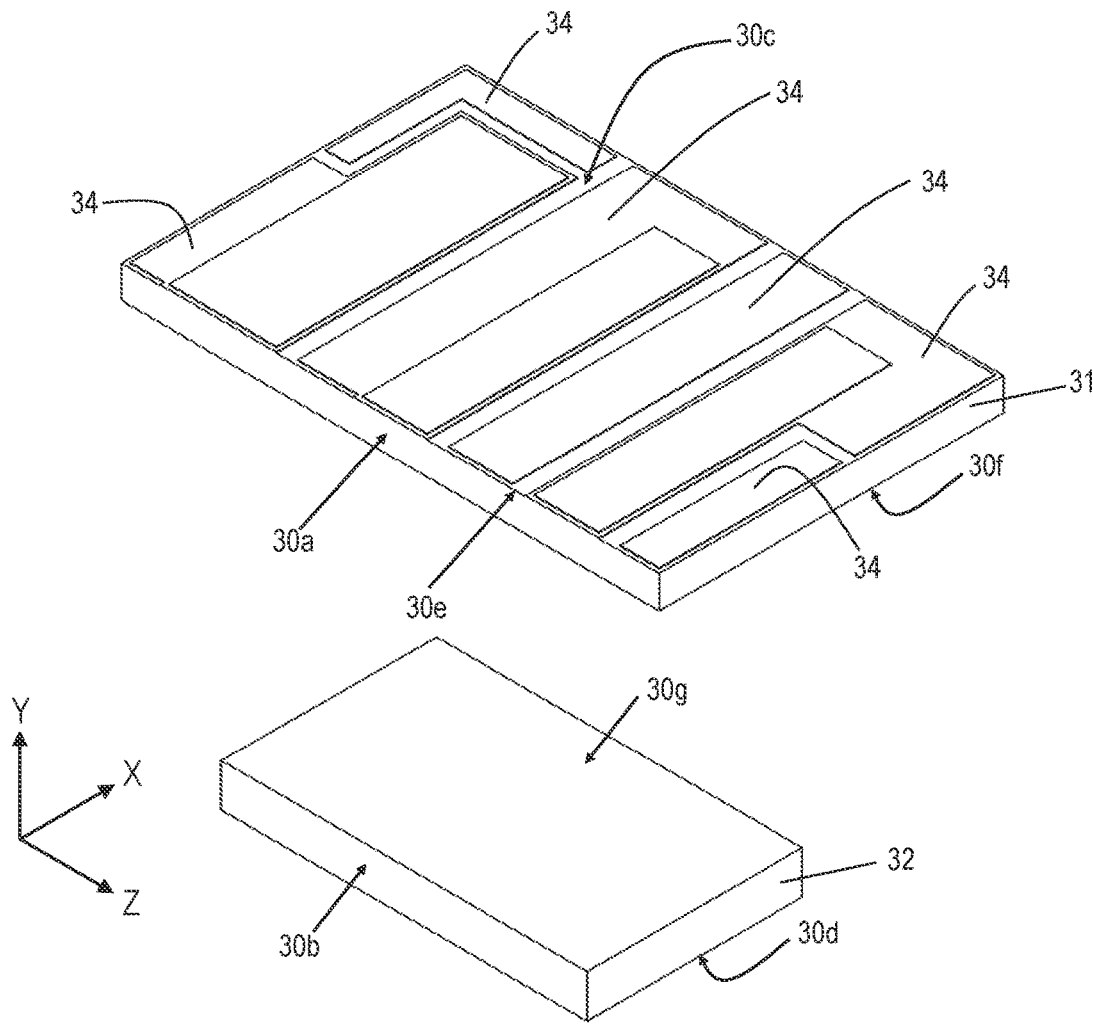
FIG. 10 is an exploded perspective view of the submount according to the first embodiment of the present disclosure.

FIG. 1 is a perspective view of a light emitting device 100 according to the present embodiment. In the attached drawings, for convenience of description, the X axis, the Y axis, and the Z axis, which are orthogonal to one another, are shown. Although the outer appearance of a light emitting device 101 according to a second embodiment described below and the outer appearance a light emitting device 102 according to a third embodiment described below also share the same perspective view as FIG. 1, the internal configuration differs from embodiment to embodiment. FIG. 2 is a perspective view of the light emitting device 100, from which a cap 16 of a package 10 is omitted. FIG. 3 is a rear view of the light emitting device 100, as viewed from the positive direction of the X axis in the figure. FIG. 4 is a side view of the light emitting device 100, as viewed from the negative direction of the Z axis in the figure. In FIG. 3 and FIG. 4, a part of a lateral face of the cap 16 is seen through to reveal light-emitting elements 20 inside the package 10. FIG. 5 is a top view of the light emitting device 100 according to the first embodiment of the present disclosure, from which the cap 16 of the package 10 is omitted. FIG. 6 is a cross-sectional view along cross-sectional line VI-VI in FIG. 1. In FIG. 5 and FIG. 6, representative rays included in a main portion of laser light LB that is emitted from the light-emitting elements 20 are indicated with broken lines. In FIG. 6, light traveling along the optical axis of the laser light LB emitted from the light-emitting elements 20 is also indicated with broken-line arrows. In FIG. 6, wires 70 are omitted for ease of viewing. FIG. 7 is a perspective view of a base portion 11. FIG. 8 is a perspective view of a submount 30. FIG. 9A is a rear view of the submount 30, as viewed from the positive direction of the X axis in FIG. 8. FIG. 9B is a side view of the submount 30, as viewed from the negative direction of the Z axis in FIG. 8. In each of FIG. 9A and FIG. 9B, for convenience of explanation, a plane containing a lower face 30d of the submount 30 is indicated with a dot-dash line. FIG. 10 is an exploded perspective view of the submount 30.

A light emitting device 100 according to the present embodiment includes multiple component elements, including a package 10, one or more light-emitting elements 20, a submount 30, and one or more wires 70. In the illustrated example of the light emitting device 100, within a space inside the package 10, three light-emitting elements 20, the submount 30 and multiple wires 70 are disposed. Moreover, divergent light that is emitted from each of the three light-emitting elements 20 is laterally emitted from the package 10 to the outside.

First, each component element will be described.
(Package 10)

The package 10 includes: a base portion 11, which includes a mounting surface 11M; and lateral wall portions 12 surrounding the mounting surface 11M. The mounting surface 11M of the base portion 11 is a region where other component elements are disposed. Moreover, the package 10 includes a substrate 15 and a cap 16 that is fixed to the substrate 15. The substrate 15 includes the base portion 11, whereas the cap 16 includes the lateral wall portions 12.

In the illustrated example, the cap 16 includes an upper portion and the lateral wall portions 12. The base portion 11 includes a lower face of the package 10; the lateral wall portions 12 include one or more lateral faces of the package 10; and the upper portion includes an upper face of the package 10. Note, however, that the lateral wall portions 12 do not need to be part of the cap 16. For example, the package 10 may alternatively be composed of one monolithic member including the base portion 11 and the lateral wall portions 12, and another member (lid) that includes the upper portion.

In a top view of the mounting surface 11M of the base portion 11 as viewed from a normal direction thereof, each of the base portion 11 and the cap 16 has a rectangular outer shape. This rectangular shape is a rectangle with shorter sides and longer sides. Each of these outer shapes does not need to be rectangular, but may be any polygon other than a quadrangle, or any shape that includes a curve(s), a bend(s), or protrusions and depressions in a part or a whole thereof.

The base portion 11 includes one or more upper faces. The one or more upper faces of the base portion 11 include the mounting surface 11M. The base portion 11 includes peripheral region 11P that surrounds one or more component elements disposed on the mounting surface 11M. The one or more upper faces of the base portion 11 include an upper face having the peripheral region 11P. In the illustrated example of the light emitting device 100, the same surface includes the mounting surface 11M and the upper face having the peripheral region 11P. Note that the mounting surface 11M and the peripheral region 11P may not be in the same plane, and may constitute different upper faces that are higher or lower in level, for example.

The peripheral region 11P is a region to which the cap 16 is bonded. In a top view, the peripheral region 11P is provided between the outer edge of the base portion 11 and a mounting region of the mounting surface 11M (i.e., a region where the multiple component elements are to be disposed). In the illustrated example of the light emitting device 100, in a top view, the mounting region of the mounting surface 11M is approximately rectangular, and the peripheral region 11P has a rectangular annular shape surrounding the mounting region. An upper face of the peripheral region 11P is bonded to a lower face of the lateral wall portions 12. A metal film for bonding with the lateral wall portions 12 may be disposed in the peripheral region 11P.

As is illustrated in FIG. 6, the package 10 includes a light-transmissive region 13, which is a region that transmits light. Moreover, the package 10 has an exiting surface 10a, which includes the light-transmissive region 13. The exiting surface 10a is one face among the one or more outer lateral faces included in the lateral wall portions 12 of the package 10. The lateral wall portions 12 include the light-transmissive region 13, and include an incident surface and the exiting surface 10a. When it is said that a region is of "light-transmissive" nature, it is meant that the subject has a transmittance of 80% or more with respect to a main portion of light entering the region.

The one or more outer lateral faces of the package 10 may also be light-transmissive in regions other than the light-transmissive region 13. Moreover, the package 10 may partially include a non-light-transmissive region (i.e., a region that does not transmit light). It is not necessary for all of the lateral wall portions 12 of the package 10 to be light-transmissive. In the illustrated example, the package 10 has four outer lateral faces of a rectangle, all of which are light-transmissive, but there exists only one exiting surface 10a.

The cap 16 may be entirely formed of a light-transmissive material, or only its lateral wall portions 12 may be formed of a light-transmissive material. One portion including the exiting surface 10a may be formed of a first light-transmissive material, while other portions may be formed of a second light-transmissive material or a non-light-transmissive material.

The cap 16 may be a monolithic piece composed of the upper portion and the lateral wall portions 12. For example, from a light-transmissive material such as glass, plastic, or quartz, a processing technique such as molding or etching may be utilized to produce a cap 16 having a desired shape e.g., a box shape. The cap 16 may be formed by bonding together an upper-surface portion (lid) and a lateral-surface portion (frame) that were separately formed by using different materials as their respective main materials. For example, the main material of the upper-surface portion may be monocrystalline or polycrystalline silicon, while the main material of the lateral-surface portion may be glass. Example dimensions of the cap 16 may be as follows: its height is not less than 0.6 mm and not more than 2.5 mm; and, in a top view, one side of its rectangular outer shape has a length of not less than 1.2 mm and not more than 8 mm. Alternatively, example dimensions of the cap 16 may be as follows: its height is not more than 2 mm; and, in a top view, one side of its rectangular outer shape has a length of not more than 4 mm.

In the illustrated example of the light emitting device 100, the exiting surface 10a is perpendicular to the directions in which the mounting surface 11M extends. As used herein, being "perpendicular" admits of a difference within ±5 degrees. Moreover, the exiting surface 10a does not need to be perpendicular to the directions in which the mounting surface 11M of the base portion 11 extends, and may be inclined therefrom.

A plurality of wiring regions 14 are provided on the mounting surface 11M. The plurality of wiring regions 14 may be electrically connected to wiring regions provided on the lower face of the base portion 11 through via holes extending inside the base portion 11. The plurality of wiring regions 14 may be a patterned film or layer that is formed of an electrical conductor, e.g., a metal. Each wiring region 14 may be a single-layer film or a multilayer film of Au, Ti, Ni, Cr, Pt, or the like, for example.

A bonding region 14a is provided on the mounting surface 11M. In the bonding region 14a, a patterned film or layer that is formed of an electrical conductor such as a metal may be provided, for example. The metal to be provided in the bonding region 14a may be the same metal that is used for forming the wiring regions 14. By using the same material, a metal film or a metal layer can be formed concurrently in the wiring regions 14 and in the bonding region 14a.

In the example shown in FIG. 7, in a top view, the wiring regions 14 are formed symmetrically. Each wiring region can be electrically connected to one or more component elements. It is utilized to receive power supplied from outside of the package 10.

In the illustrated example, the wiring regions 14 include multiple pairs of wiring regions 14 that are provided around the bonding region 14a. In a top view, the bonding region 14a has a greater area than that of respective two wiring regions of each pair of wiring regions 14. The multiple pairs of wiring regions 14 include: a pair of wiring regions 14b that are provided at a position away from the bonding region 14a in the positive direction of the Z axis; a pair of wiring regions 14c that are provided at a position away from the bonding region 14a in the negative direction of the Z axis; and a pair of wiring regions 14d that are provided at a position away from the bonding region 14a in the positive direction of the X axis. The position at which the pair of wiring regions 14d are provided are not away from the bonding region 14a along the Z axis. Note that the shorter sides of the base portion 11 extend in the same direction as the X axis, while the longer sides of the base portion 11 extend in the same direction as the Z axis. The positive direction and the negative direction are of such a relationship that one of these directions is the opposite to the other.

The substrate 15 may be formed of ceramic as a main material. Examples of ceramics to be used for the substrate 15 include aluminum nitride, silicon nitride, aluminum oxide, and silicon carbide. In the present embodiment, the substrate 15 may be composed of a ceramic substrate that includes metal vias inside, for example.

(Light-Emitting Element 20)

An example of a light-emitting element 20 is a semiconductor laser element. The light-emitting element 20 may have a rectangular outer shape in a top view. In the case in which the light-emitting element 20 is an edge-emitting type semiconductor laser element, a lateral surface that meets a short side of two sides of the rectangle defines an exiting lateral surface 20e through which light is emitted. In this example, each of an upper face and a lower face of the light-emitting element 20 has a greater area than that of the exiting lateral surface 20e. The light-emitting element 20 is not limited to an edge-emitting type semiconductor laser element. The light-emitting element 20 may be a surface emitting type semiconductor laser element, a light-emitting diode (LED), or the like.

The light-emitting element 20 according to the present embodiment includes one or more emitters. The light-emitting element 20 may be a single-emitter (i.e., having one emitter) or a multi-emitter (i.e., having two or more emitters). In FIG. 5, light LB that is emitted from one emitter is conveniently illustrated for each light-emitting element 20.

In the case in which the light-emitting element 20 is a semiconductor laser element, the light that is emitted from the exiting lateral surface 20e of the semiconductor laser element (laser light) is divergent light having spread. The laser light creates a far field pattern (hereinafter referred to as "FFP") of an elliptical shape at a face that is parallel to the exiting lateral surface 20e. The FFP refers to the shape, or optical intensity distribution, of emitted light at a position away from the light-exiting surface.

Light that passes through a center of the elliptical shape of the FFP, i.e., light having a peak intensity in the optical intensity distribution of the FFP, will be referred to as "light traveling on an optical axis." Moreover, the optical path of light traveling on an optical axis will be referred to as "the optical axis" of that light. In the optical intensity distribution of an FFP, light having an intensity that is $1/e^2$ or greater with respect to the peak intensity value may be referred to as the "main portion" of light.

In the elliptical shape of an FFP of light that is emitted from the light-emitting element 20 being a semiconductor laser element, the minor axis direction of the ellipse will be referred to as the slow-axis direction, and its major axis direction will be referred to as the fast-axis direction. The plurality of layers that compose the semiconductor laser element (including an active layer) may be layered in the fast-axis direction.

Based on the optical intensity distribution of the FFP, an angle corresponding to $1/e^2$ of the optical intensity distribution is defined as an angle of spread of the light from the semiconductor laser element. An angle of spread of light along the fast-axis direction will be referred to as an "angle of spread along the fast-axis direction," whereas an angle of spread of light along the slow-axis direction will be referred to as an "angle of spread along the slow-axis direction".

As the light-emitting element 20, for example, a semiconductor laser element emitting blue light, a semiconductor laser element emitting green light, a semiconductor laser element emitting red light, or the like may be adopted. Semiconductor laser devices emitting any other colors of light may also be used.

Herein, blue light refers to light having an emission peak wavelength range from 420 nm to 494 nm. Green light refers to light having an emission peak wavelength range from 495 nm to 570 nm. Red light refers to light that having an emission peak wavelength range from 605 nm to 750 nm.

Examples of semiconductor laser elements emitting blue light or semiconductor laser elements emitting green light may be semiconductor laser elements containing a nitride semiconductor. As the nitride semiconductor, for example, GaN, InGaN, or AlGaN may be used. Examples of semiconductor laser elements emitting red light may be those containing an InAlGaP-based, GaInP-based, GaAs-based, or AlGaAs-based semiconductor.

(Submount 30)

With reference to FIG. 8 to FIG. 10, an example structure of the submount 30 according to the present embodiment will be described.

The submount 30 includes an upper face 30c, a lower face 30d, a first lateral face 30a, and a second lateral face 30b. The submount 30 also has a lower face 30f. For distinction, the lower face 30d and the lower face 30f will be respectively referred to as a first lower face 30d and a second lower face 30f.

The second lateral face 30b is located on the same side as the first lateral face 30a. The submount 30 has: a plurality of upper-level lateral faces 30x, including the first lateral face 30a; and a plurality of lower-level lateral faces 30y, including the second lateral face 30b. The plurality of upper-level lateral faces 30x intersect the upper face 30c. The plurality of lower-level lateral faces 30y intersect the first lower face 30d. The second lower face 30f intersects the upper-level lateral faces 30x and the lower-level lateral faces 30y. The upper face 30c functions as a mounting surface on which other component elements may be placed. The first lower face 30d functions as a bonding surface with another component element on which the submount 30 may be placed.

In the illustrated example, the plurality of upper-level lateral faces 30x are above and separated from a plane containing the first lower face 30d. In a top view, the first lower face 30d is set back inside of the submount 30, relative to an edge 30e at which the upper face 30c and the first lateral face 30a intersect. In a top view, the second lateral face 30b is located farther inside the submount 30 than is the first lateral face 30a. The second lateral face 30b does not intersect the first lateral face 30a.

The angle α between the second lateral face 30b and the first lower face 30d may be e.g. greater than 90° but not greater than 100°. In the illustrated example, the angle α is 90°±5°. An area of the upper face 30c is greater than an area of the lower face 30d, and, in a top view, the first lower face 30d is encompassed within the upper face 30c.

The distance ("first distance") from the first lateral face 30a to the second lateral face 30b is shorter than the distance ("second distance") from the upper-level lateral face 30x that is opposite to the first lateral face 30a and the lower-level lateral face 30y that is opposite to the second lateral face 30b. The first distance may be not less than 100 μm and not more than 200 μm. The second distance may be not less than 1.5 times the first distance and not more than 3.0 times the first distance.

On the upper face 30c of the submount 30, one or more wiring regions 34, which are a patterned film or layer, may be formed of an electrical conductor such as a metal. The one or more wiring regions 34 may be electrically connected to other component elements. Each wiring region 34 may be a single-layer film or a multilayer film of Au, Ti, Ni, Cr, or Pt, for example.

The submount 30 according to the present embodiment includes a first portion 31 and a second portion 32. The first portion 31 composes the upper face 30c and the plurality of upper-level lateral faces 30x of the submount 30. The second portion 32 composes the plurality of lower-level lateral faces 30y and the lower face 30d of the submount 30. The first portion 31 and the second portion 32 may be distinct members from each other. The submount 30 may be formed by bonding the first portion 31 and the second portion 32 together. The submount 30 may be composed of one monolithic member including the first portion and the second portion. Hereinafter, the first portion 31 will be referred to as the first submount 31, while the second portion 32 will be referred to as the second submount 32.

In the illustrated example, each of the first submount 31 and the second submount 32 may be shaped as a rectangular solid. By using the first submount 31 and the second submount 32 of such shapes, it becomes easier to produce the submount 30. Note that the shape of each member does not need to be a rectangular solid. In a top view, the area of the first submount 31 is greater than the area of the second submount 32. In a top view, the second submount 32 is encompassed within the first submount 31. The region of the lower face 30f of the first submount 31 that is exposed around the second submount 32 constitutes the lower face 30f of the submount 30.

In the present embodiment, the first submount 31 and the second submount 32 are formed of the same main material. However, the main material of the first submount 31 may be different from the main material of the second submount 32. Because the wiring regions are formed on the upper face 30c of the first submount 31, it is preferable that at least the first submount 31 is formed of an electrically insulative material. Examples of main materials that are electrically insulative include aluminum nitride and silicon carbide.

A metal paste has a lower bonding temperature than that of solder, for example. Using a metal paste as a bonding material instead of solder allows the first submount 31 and the second submount 32 to be bonded together at a relatively low temperature. Although depending on the manufacturing process for the light emitting device 100, this may contribute to the reduction of damage to the light-emitting element(s) 20 bonded to the upper face 30c of the first submount 31, or the reduction of influences on temperature characteristics.

(Wire 70)

Each wire 70 is formed of an electrical conductor having a linear shape. At both ends of its linear body, the wire 70 bonds to other component elements. The wire 70 may be a metal wire, for example. Examples of the metals include gold, aluminum, silver, and copper.

(Light Emitting Device 100)

Next, the light emitting device 100 will be described.

In the exemplary light emitting device 100 described below, each of the light emitting element(s) 20 is an edge-emitting type semiconductor laser element (laser diode).

In the light emitting device 100, the one or more light-emitting elements 20 are disposed inside the package 10. The one or more light-emitting elements 20 are disposed on the mounting surface 11M of the base portion 11. The one or more light-emitting elements 20 are surrounded by the lateral wall portions 12 of the package 10. Each light-emitting element 20 is disposed on the mounting surface 11M via a submount 30. Each light-emitting element 20 is disposed on the upper face 30c of the submount 30. Laser light that is emitted from at least one light-emitting element 20 is transmitted through the lateral wall portions 12, and is emitted to the outside of the cap 16.

In the illustrated example of the light emitting device 100, the light emitting device 100 includes a plurality of light-emitting elements 20. Each light-emitting element 20 is disposed so that its exiting lateral surface 20e is oriented toward the exiting surface 10a of the package 10. The emission points of the plurality of light-emitting elements 20 are arranged side by side along the Z axis. The optical axis of light that is emitted from each light-emitting element 20 is parallel to the X axis direction in the figures. As used herein, being "parallel" permits a margin of error within ±5 degrees.

The plurality of light-emitting elements 20 of the light emitting device 100 may include: a first light-emitting element 20 to emit first light having an emission peak at a first wavelength; a second light-emitting element 20 to emit second light having an emission peak at a second wavelength that is different from the first wavelength; and a third light-emitting element 20 to emit third light having an emission peak at a third wavelength that is different from the first wavelength and the second wavelength.

In the illustrated example of the light emitting device 100, the light emitting device 100 includes three light-emitting elements 20. The three light-emitting elements 20 emit respectively different colors of light that are selected from among red light, green light, and blue light. Note that the colors of the light emitted from the light-emitting elements 20 are not limited thereto; neither are the colors limited to those of visible light.

In the present specification, the three light-emitting elements 20 may be respectively referred to as the first light-emitting element, the second light-emitting element, and the third light-emitting element for distinction. The light beams emitted from the respective light-emitting elements 20 may be referred to as the first light, the second light, and the third light for distinction.

The submount 30 is fixed to the bonding region 14a. The submount 30 and the base portion 11 are bonded to each other on the bonding region 14a via a bonding material such as gold paste. Between the lower face 30d of the submount 30 and the bonding region 14a, a bonding layer 39 is formed of the bonding material (see FIG. 6). Also, a portion of the bonding material protrudes from the lower face 30d to form a bonding member 35.

A material that has a high melting point and a low bonding temperature is preferably used for the bonding material. For example, a material containing metal nanoparticles or metal submicron particles in addition to an organic solvent can be used. Moreover, a paste containing metal particles of gold (hereinafter referred to as "metal paste") is preferably used, for example. It is also possible to use a metal paste containing metal particles such as silver or copper. The metal paste has a viscosity in the range from 50 to 150 Pa·s, for example. In the case in which a material containing an organic solvent is used for the bonding material, the organic solvent volatilizes through a curing treatment of the bonding material. As a result, the bonding layer 39 and the bonding member 35 that are formed of the bonding material will contain the metal as their main material.

The bonding member 35 is formed along one or more lower-level lateral faces 30y of the submount 30. The bonding member 35 includes a first bonding portion(s) 35a and a second bonding portion(s) 35b. The first bonding portion(s) 35a is/are formed along one or two lower-level lateral faces 30y in a pair of lower-level lateral faces 30y extending along the X axis direction. The second bonding portion(s) 35b is/are formed along one or two lower-level lateral faces 30y in a pair of lower-level lateral faces 30y extending along the Z axis direction. The second bonding portion 35b extends along the second lateral face 30b. Each of the first bonding portion(s) 35a and the second bonding portion(s) 35b has a raised shape.

The first lateral face 30a of the submount 30 is located at a side of the exiting lateral surface 20e of the light-emitting element 20, intersects the upper face 30c of the submount 30, and is above and separated from the mounting surface 11M of the base portion 11. In the illustrated example, a portion of the bonding material protrudes from the lower face 30d of the submount 30 in the positive and negative directions of the X axis and in the positive and negative directions of the Z axis, thereby forming the bonding member 35.

The bonding member 35 extends outward of the edge 30e at which the lower face 30d and the second lateral face 30b of the submount 30 intersect. Furthermore, as illustrated in FIG. 5, in a top view, the bonding member 35 extends outward of the upper face 30c of the submount 30. In a top view, the second bonding portion(s) 35b extends outward of the upper face 30c of the submount 30. The second bonding portion 35b extending along the second lateral face 30b is in contact with the second lateral face 30b and has a height greater than that of the bonding layer 39. As a result, bonding strength of the submount 30 can be enhanced.

The bonding member 35 extends outward of the edge at which the lower face 30d of the submount 30 and the lower-level lateral face 30y that is opposite to the second lateral face 30b intersect. Furthermore, in a top view, the bonding member 35 does not protrude outside from the upper-level lateral face 30x that is opposite to the first lateral face 30a. Note that the submount 30 may be bonded without the bonding material protruding from the lower face 30d.

Dot-dash lines in FIG. 6 indicate the following: an imaginary plane P1 that passes through the edge at which the lower face 30d of the submount 30 and the second lateral face 30b intersect and that is perpendicular to the mounting surface 11M of the base portion 11; and an imaginary plane P2 that passes through the edge at which the upper face 30c of the submount 30 and the first lateral face 30a intersect and that is perpendicular to the mounting surface 11M of the base portion 11. In the illustrated example, the exiting lateral surface 20e of the light-emitting element 20 is located between the plane P1 and the plane P2. As used herein, a place "between the plane P1 and the plane P2" is inclusive of a place that is upon the plane P1 or the plane P2. Note that the exiting lateral surface 20e of the light-emitting element 20 may protrude from the upper face 30c of the submount 30.

Figure 11:
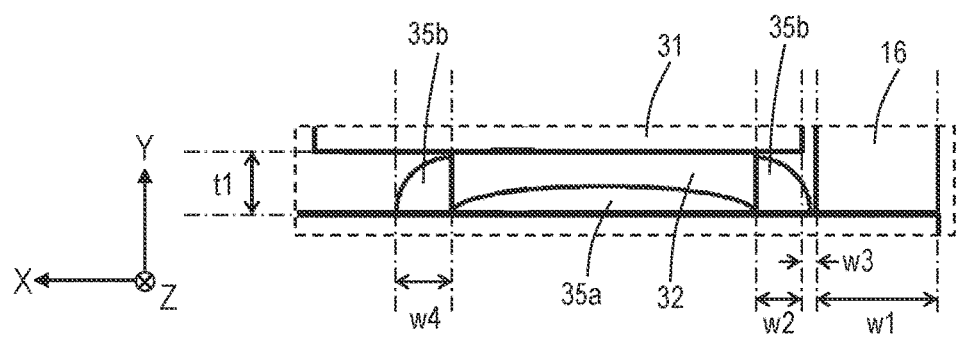
FIG. 11 is an enlarged view of a portion X1 in the side view of FIG. 4.

FIG. 11 is an enlarged view of a portion X1 in the side view of FIG. 4. In the present embodiment, the thickness w1 of a lateral wall portion 12 of the package 10 along the X axis direction may be not less than 350 µm and not more than 450 µm. The interspace w2 between the first lateral face 30a and the second lateral face 30b of the submount 30 along the X axis direction may be not less than 100 µm and not more than 200 µm. The interspace w3 between the lateral wall portion 12 of the package 10 and the first lateral face 30a of the submount 30 along the X axis direction may be not less than 50 µm and not more than 100 µm. The width w4 of a second bonding portion 35b along the X axis direction may be not less than 100 µm and not more than 300 µm. The thickness t1 of the second submount 32 along the Y axis direction may be not less than 100 µm and not more than 400 µm.

The closer the second lateral face 30b is to the exiting lateral surface 20e of the light-emitting element 20, the more enhanced the thermal radiation effect by the submount 30 will be. On the other hand, if it is too close, the bonding material becomes likely to protrude outside from the submount 30, thus increasing the distance from the exiting lateral surface 20e to the lateral wall portion 12. In terms of accuracy of mounting, there is preferably some interspace between the exiting lateral surface 20e and the cap 16. Therefore, for the sake of reducing the size of the light emitting device 100, the protrusion of the bonding material should preferably fit within this interspace.

In the light emitting device 100, one or more wires 70 are bonded to the wiring region(s) 14 of the package 10, and bonded to the semiconductor laser element(s) 20.

As shown in FIG. 5, among the three light-emitting elements 20, the wire 70 that is electrically connected to the first light-emitting element 20 being located in the middle is bonded to the wiring region 14d.

Among the three light-emitting elements 20, the wire 70 that is electrically connected to the second light-emitting element 20 being located in the negative direction of the Z axis from the first light-emitting element 20 is bonded to the wiring region 14c.

Among the three light-emitting elements 20, the wire 70 that is electrically connected to the third light-emitting element 20 being located in the positive direction of the Z axis from the first light-emitting element 20 is bonded to the wiring region 14b.

Figure 12A:
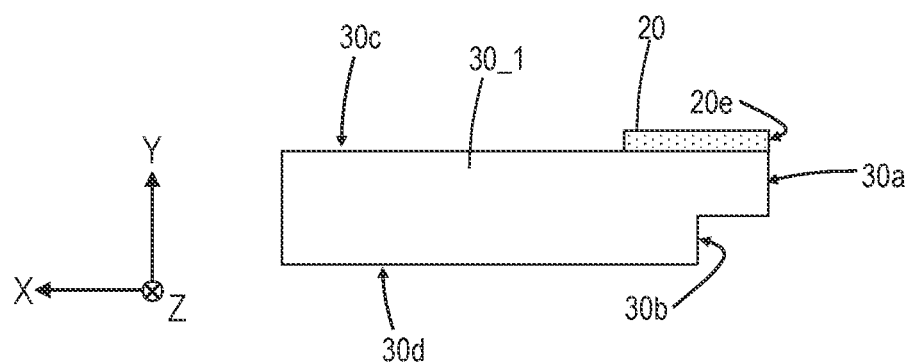
FIG. 12A is a side view illustrating a variation for the submount according to the first embodiment of the present disclosure.
Figure 12B:
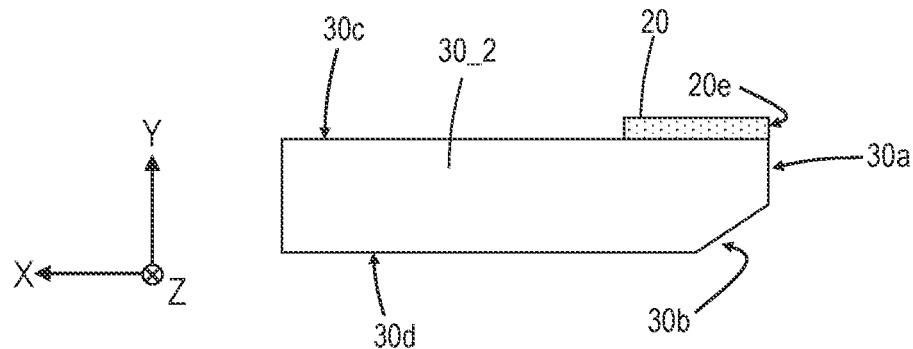
FIG. 12B is a side view illustrating a variation for the submount according to the first embodiment of the present disclosure.

In the present embodiment, the submount 30 may have a variety of shapes, without being limited to the aforementioned shape. FIG. 12A and FIG. 12B are side views illustrating variations for the submount 30.

As shown in FIG. 12A, the step structure does not need to be formed around the entire periphery of the lateral faces, unlike that of the submount 30. The submount 30_1 shown in FIG. 12A has a step structure below the first lateral face 30a.

As shown in FIG. 12B, instead of a step structure, a slope may be provided. In this example, there is no face that corresponds to the lower face 30f of the submount 30, such that the second lateral face 30b connects to the first lateral face 30a and to the lower face 30d. The second lateral face 30b has a slope that is slanted with respect to the lower face 30d at a predetermined angle.

With these submounts, a space is provided for accommodating a portion of the bonding material that bonds the base portion 11 and the submount 30 together. Note that, as compared to a structure in which the first lateral face 30a and the second lateral face 30b intersect (as shown in FIG. 12B), a structure in which the first lateral face 30a and the second lateral face 30b do not intersect (as shown in FIG. 9B and FIG. 12A) makes it more difficult for the protruding bonding material to protrude also from the first lateral face 30a.

In the light emitting device 100, the plurality of light-emitting elements 20 emit light sideways. The light is emitted from the exiting lateral surface 20e, traveling on its optical axis, proceeds in parallel to the mounting surface 11M. The light emitted from each light-emitting element 20 is transmitted through the lateral wall portion 12 of the package 10, and exits sideways from the light-transmissive region 13.

In the light emitting device 100, a closed space is sealed inside the package 10. By bonding the first substrate 15 and the cap 16 in a predetermined ambient, a hermetically-sealed closed space is created inside the package 10. In the light-emitting elements 20 such as semiconductor laser elements, by hermetically sealing the space in which the light-emitting elements 20 are disposed, deteriorations in quality due to collection of dust can be suppressed.

The center axis of the light extracted from the exiting surface 10a is perpendicular to the exiting surface 10a. As used herein, being "perpendicular" admits of a difference within ±5 degrees. Moreover, the center axis of light does not need to be perpendicular to the exiting surface 10a.

With the light emitting device 100 according to the present embodiment, between the submount 30 and the mounting surface 11M of the base portion 11, a space for accommodating a portion of the bonding material is provided. This allows the submount 30 to be closer to the lateral wall portions 12 of the cap 16, thereby enabling a reduction in the size of the light emitting device 100.

Second Embodiment

A light emitting device 101 according to a second embodiment differs from the light emitting device 100 of the above-described first embodiment in that concavities are created in the lateral faces of the submount. Hereinafter, differences from the light emitting device 100 according to the first embodiment will mainly be described.

With reference to FIG. 13 to FIG. 21, the light emitting device 101 according to the present embodiment will be described.

Figure 13:
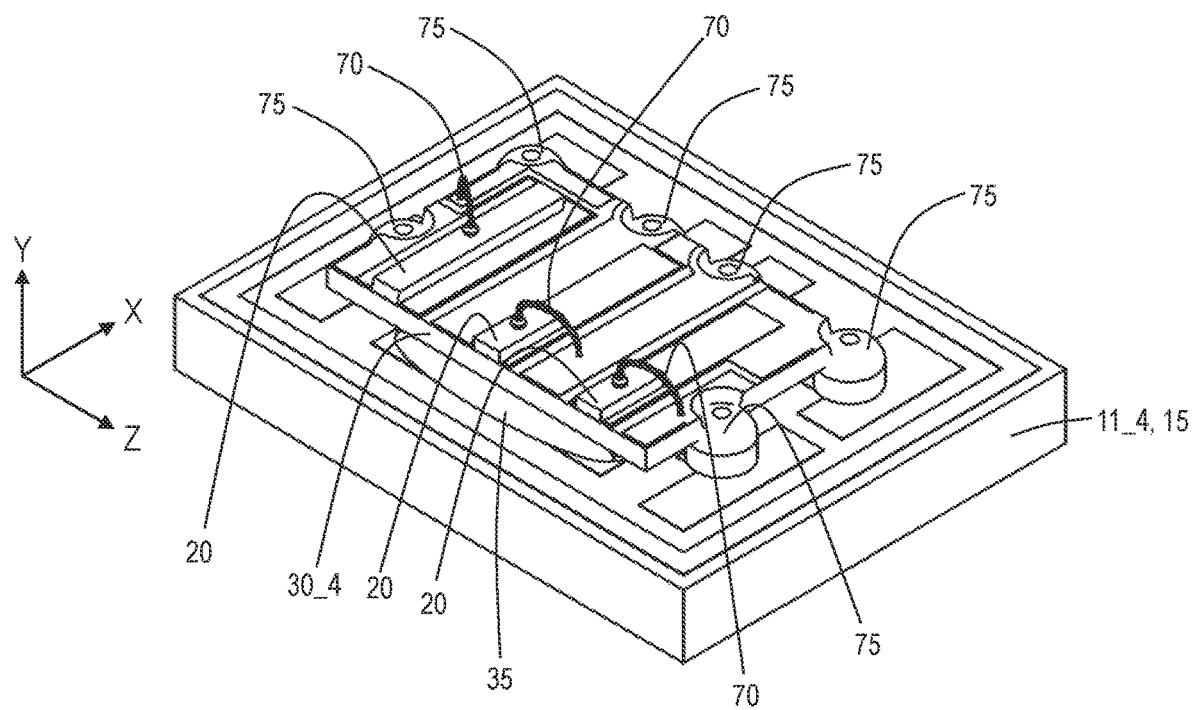
FIG. 13 is a perspective view of the light emitting device according to the second embodiment of the present disclosure, from which a cap of a package is omitted.
Figure 14:
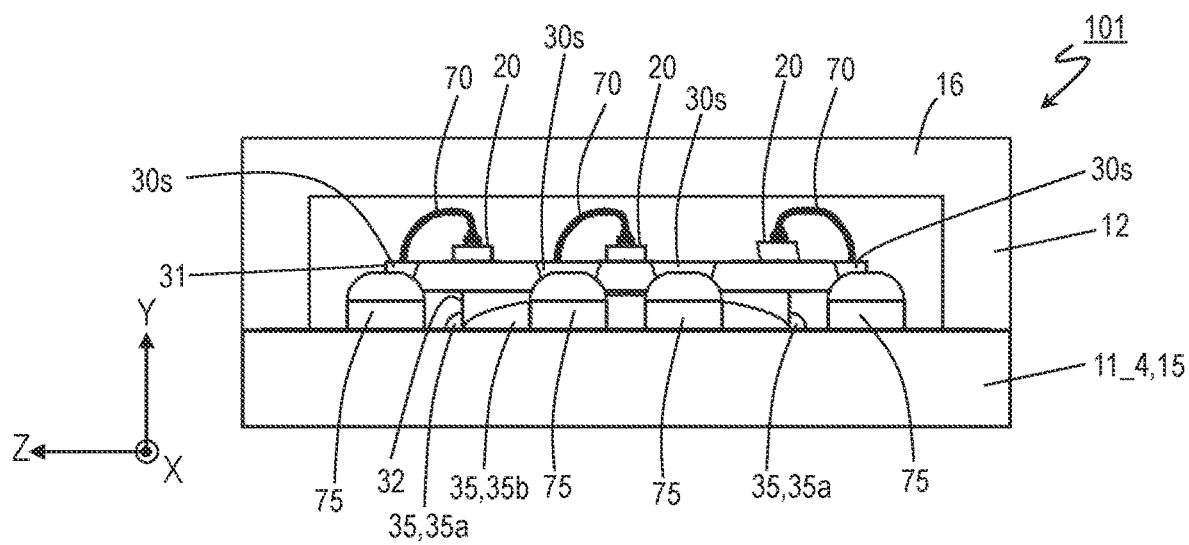
FIG. 14 is a rear view of the light emitting device according to the second embodiment of the present disclosure, as viewed from the positive direction of the X axis in FIG. 13.
Figure 15:
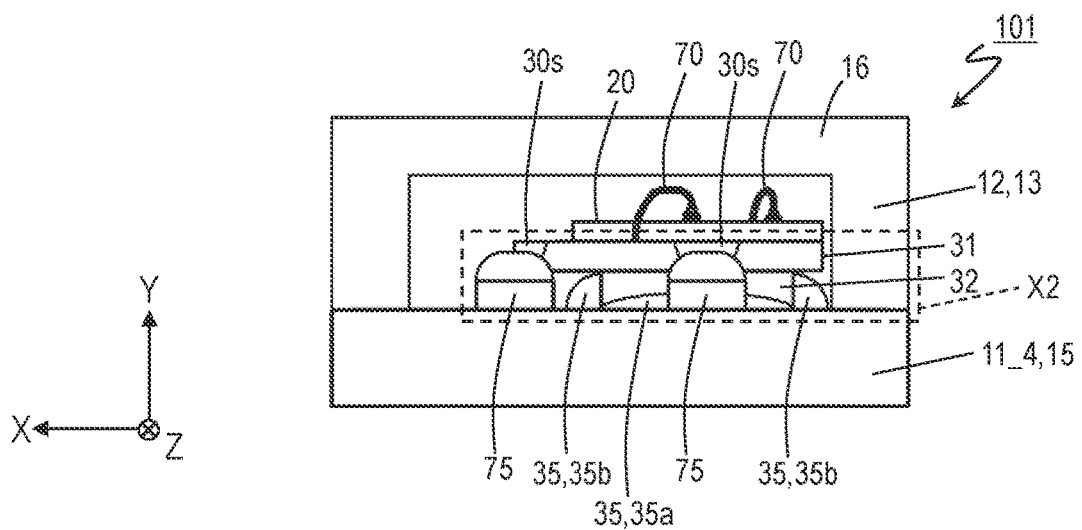
FIG. 15 is a side view of the light emitting device according to the second embodiment of the present disclosure, as viewed from the negative direction of the Z axis in FIG. 13.
Figure 16:
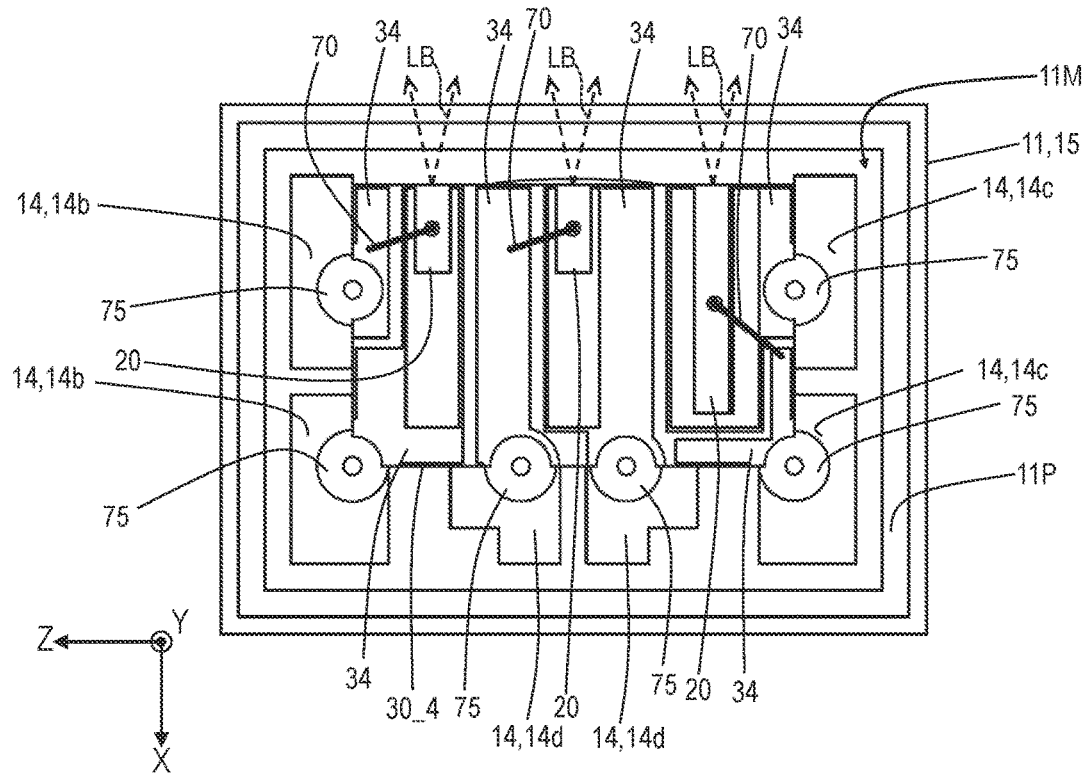
FIG. 16 is a top view of the light emitting device according to the second embodiment of the present disclosure, from which the cap of the package is omitted.
Figure 17:
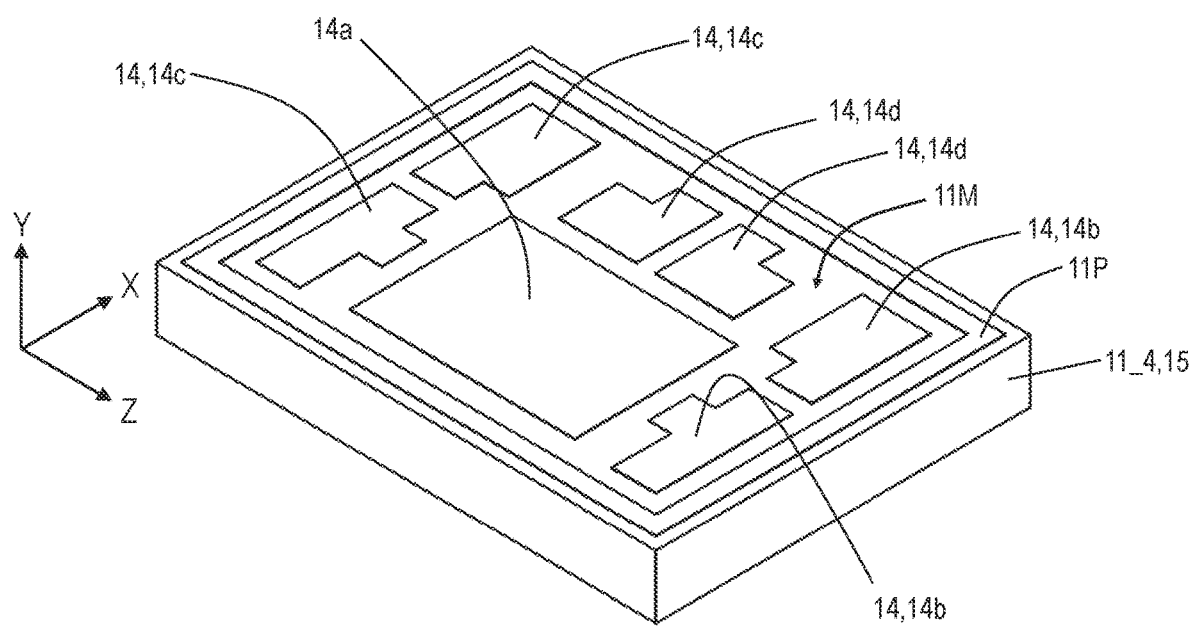
FIG. 17 is a perspective view of a base portion according to the second embodiment of the present disclosure.
Figure 18:
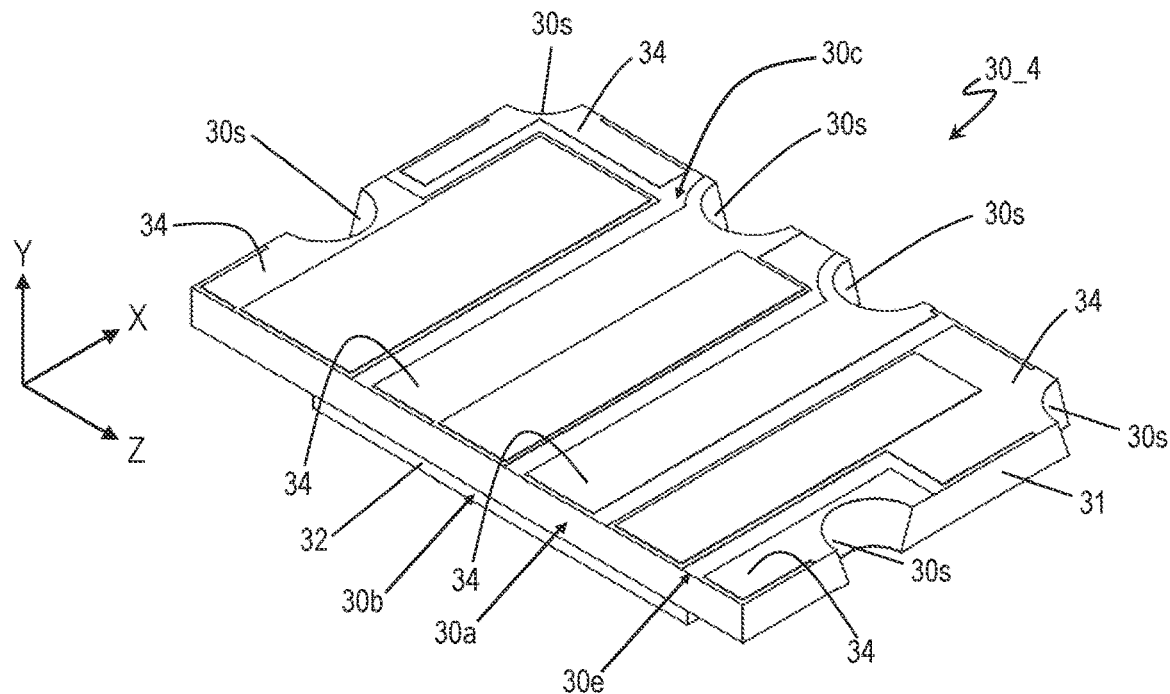
FIG. 18 is a perspective view of a submount according to the second embodiment of the present disclosure.
Figure 19A:
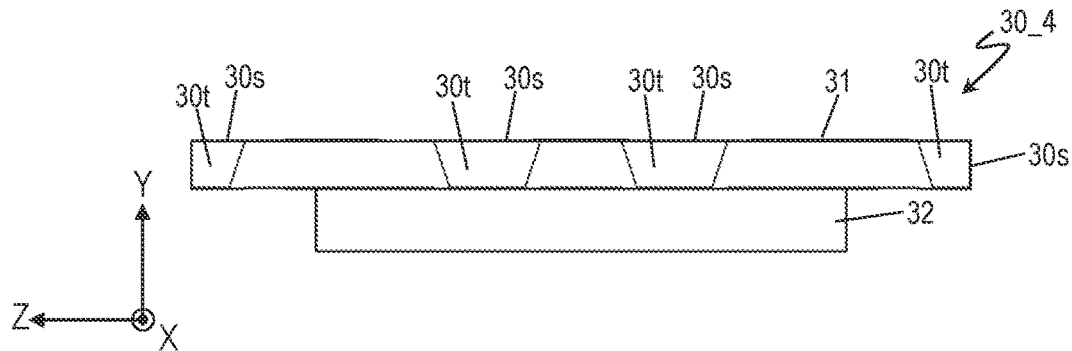
FIG. 19A is a rear view of the submount according to the second embodiment of the present disclosure, as viewed from the positive direction of the X axis in FIG. 18.
Figure 19B:
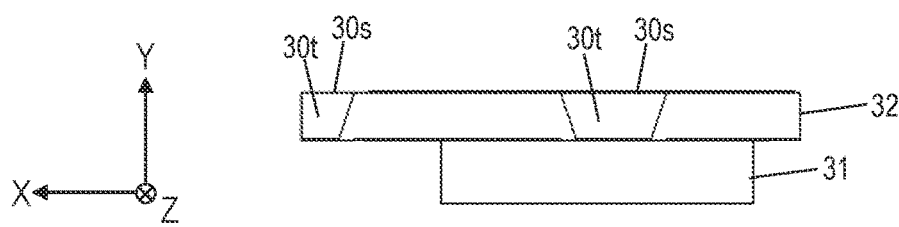
FIG. 19B is a side view of the submount according to the second embodiment of the present disclosure, as viewed from the negative direction of the Z axis in FIG. 18.
Figure 20:
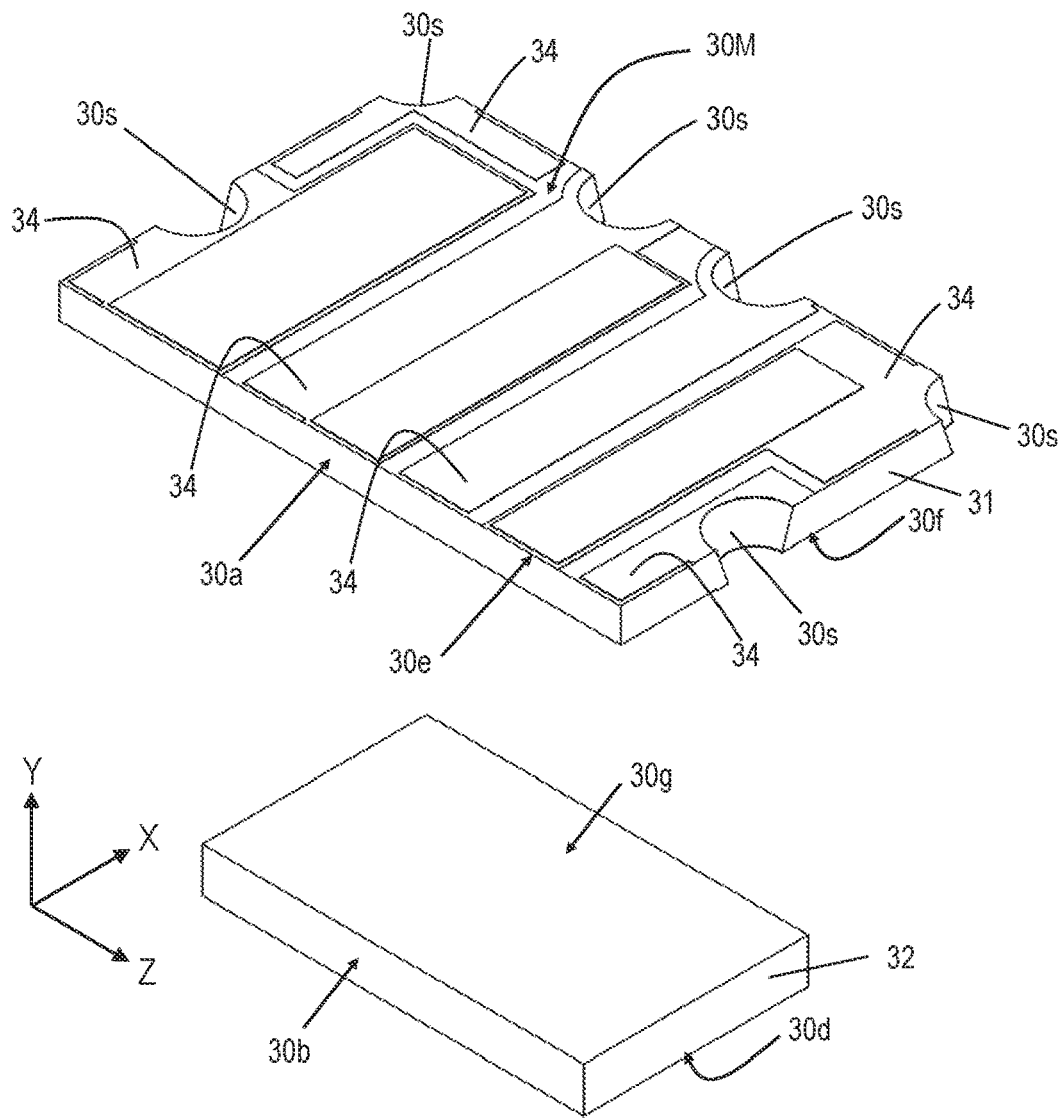
FIG. 20 is an exploded perspective view of the submount according to the second embodiment of the present disclosure.
Figure 21:
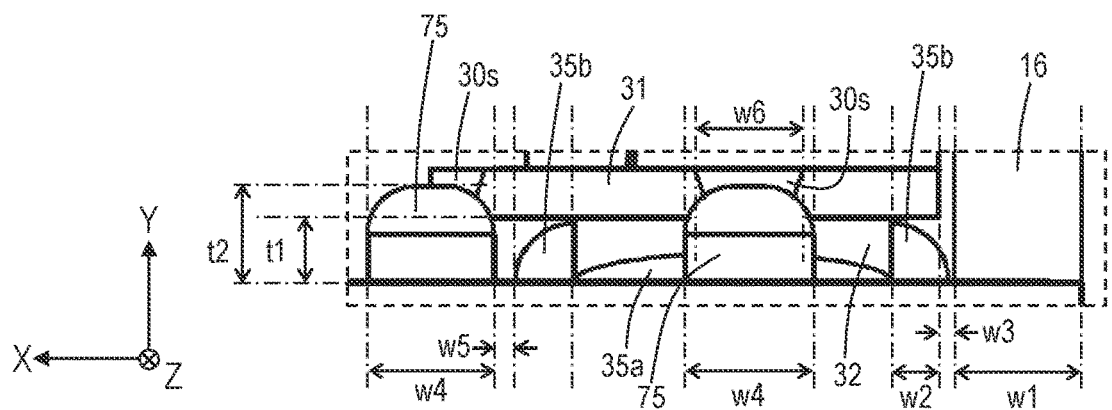
FIG. 21 is an enlarged view of a portion X2 in the side view of FIG. 15.

FIG. 13 is a perspective view of the light emitting device 101, from which a cap 16 of a package 10 is omitted. FIG. 14 is a rear view of the light emitting device 101, as viewed from the positive direction of the X axis in FIG. 13. FIG. 15 is a side view of the light emitting device 101, as viewed from the negative direction of the Z axis in FIG. 13. In FIG. 14 and FIG. 15, a part of a lateral face of the cap 16 is seen through to reveal the light-emitting elements 20 inside the package 10. FIG. 16 is a top view of the light emitting device 101, from which the cap 16 of the package 10 is omitted. In FIG. 16, representative rays included in a main portion of laser light LB that is emitted from the light-emitting elements 20 are indicated with broken lines. FIG. 17 is a perspective view of a base portion 11. FIG. 18 is a perspective view of a submount 30_4. FIG. 19A is a rear view of the submount 30_4, as viewed from the positive direction of the X axis in FIG. 18. FIG. 19B is a side view of the submount 30_4, as viewed from the negative direction of the Z axis in FIG. 18. FIG. 20 is an exploded perspective view of the submount 30_4. FIG. 21 is an enlarged view of a portion X2 in the side view of FIG. 15. Note that a perspective view of the light emitting device 101 is as presented in FIG. 1.

(Base Portion 114)

The base portion 11_4 includes wiring regions 14b that differ in shape from the wiring regions 14b of the base portion 11. The wiring regions 14 of the base portion 11_4 include wiring regions 14b and wiring regions 14c, which in turn include convex regions projecting toward the bonding region 14a.

(Submount 30_4)

In the submount 30_4, one or more recesses 30s are provided. The recess(es) 30s defines a concavity/concavities going into the submount 30_4 from the upper-level lateral faces 30x. In a top view, the concavity/concavities defined by the recess(es) 30s penetrate the submount 30_4. The first submount 31 has one or more recesses 30s. On the contrary, the second submount 32 does not have any recesses 30s.

In a top view, the one or more recesses 30s create a concavity/concavities at the outer periphery of the upper face 30c of the submount 30_4. The one or more recesses 30s include one or more recesses 30s that are respectively provided in the two upper-level lateral faces 30x intersecting the first lateral face 30a of the submount 30_4. The one or more recesses 30s include one or more recesses 30s that are provided in the upper-level lateral face 30x that is opposite to the first lateral face 30a. The one or more recesses 30s do not intersect the first lateral face 30a. In the submount 30_4, no concavities are created that go into the submount 30_4 from the first lateral face 30a.

In the illustrated example, among the plurality of upper-level lateral faces 30x of the submount 30_4, the first lateral face 30a is referred to as a first face; any lateral face that is opposite to the first lateral face 30a and that forms a plane is referred to as a second face; any lateral face that is perpendicular to the first lateral face 30a in a top view and that forms a plane is referred to as a third face; and any lateral face that is perpendicular to the first lateral face 30a in a top view and which that a plane not being coplanar with the third face is referred to as a fourth face. The light emitting device 101 includes one first face, three second faces, two third faces, and two fourth faces. Moreover, the plurality of upper-level lateral faces 30x also include the lateral faces of the one or more recesses 30s themselves.

In the illustrated example, the submount 30_4 has a plurality of recesses 30s. The plurality of recesses 30s include recesses 30s each intersecting two second faces. Each such recess 30s can be regarded as a recess 30s interconnecting two second faces. The plurality of recesses 30s include recesses 30s each intersecting two third faces. Each such recess 30s can be regarded as a recess 30s interconnecting two third faces. The plurality of recesses 30s include recesses 30s each intersecting two fourth faces. Each such recess 30s can be regarded as a recess 30s interconnecting two fourth faces. The plurality of recesses 30s include a recess 30s that intersects a second face and a third face; this recess 30s can be regarded as a recess 30s that is provided in a corner of the submount 30_4. The plurality of recesses 30s include a recess 30s that intersects a second face and a fourth face; this recess 30s can be regarded as a recess 30s that is provided in a corner of the submount 30_4.

Each recess 30s is preferably formed in a tapered shape that narrows downward beginning from the upper face 30c of the first submount 31. Giving a tapered shape to each recess 30s makes it easier to form a metal film in the recess 30s, as will be described below. The recesses 30s can be formed on the lateral faces of the submount 30_4 through a blast treatment or laser processing, for example.

In a comparison between the submount 30 and the submount 30_4, recesses 30s are created in the submount 30_4 in a manner of partially gouging out the wiring regions 34 of the submount 30. In the submount 30_4, the one or more recesses 30s intersect the wiring region(s) 34.

On the lateral surface of each recess 30s, an electrically conductive region 30t is provided. The electrically conductive region 30t can be formed by providing a metal film of Au or the like, for example. The electrically conductive region 30t of each recess 30s is connected to a wiring region 34. Therefore, the electrically conductive region 30t and the wiring region 34 are electrically connected.

(Electrically Conductive Member 75)

The electrically conductive member(s) 75 is formed by using an electrically conductive paste material, which conducts electricity. As the electrically conductive paste material, a metal paste of e.g. Au, Ag, or Cu, any of which has a high melting point and a low bonding temperature, is preferably used. The electrically conductive member(s) 75 can be formed by sintering such an electrically conductive paste material at a relatively low temperature (e.g. 200° C.). For example, by using a gold paste as the electrically conductive paste material, damage to the semiconductor laser element 20 or influences on the temperature characteristics can be reduced.

(Light Emitting Device 101)

In the light emitting device 101, the bonding between the base portion 11_4 and the submount 30_4, the mounting of the light-emitting element(s) 20 to the submount, and the bonding of the cap 16 to the base portion 11_4 are the same as in the description concerning the light emitting device 100. A main difference of the light emitting device 101 from the light emitting device 100 lies in the wiring method for establishing electrical connection of the light-emitting element(s) 20.

In the light emitting device 101, the electrically conductive member(s) 75 is used to electrically connect the wiring region(s) 14 of the base portion 11_4 and the wiring region(s) 34 of the submount 30_4. This electrical connection is achieved by adhesively bonding the electrically conductive member(s) 75 being provided on the wiring region(s) 14 to the electrically conductive region 30t provided in the recess (es) 30s of the submount 30_4.

The light emitting device 101 includes one or more electrically conductive members 75. The one or more electrically conductive members 75 are provided on the wiring region(s) 14. Each electrically conductive member 75 is in contact with a wiring region 14, and in contact with an electrically conductive region 30t of the submount 30_4. Each electrically conductive member 75 is in contact with the lateral surface of a recess 30s of the submount 30_4. The electrically conductive member 75 is in contact with the lower face 30f of the submount 30_4 and the lateral surface of the recess 30s. The electrically conductive member 75 is not in contact with the lower-level lateral faces 30y of the submount 30_4. The electrically conductive member 75 is not in contact with the bonding member 35.

One or more electrically conductive members 75 are provided correspondingly to the one or more recesses 30s. In a top view, each electrically conductive member 75 has a larger shape than that of the concavity that is created by the recess 30s. This makes it easier for the electrically conductive member 75 to be in contact with the electrically conductive region 30t of the submount 30_4.

Thus, by using the electrically conductive member(s) 75 to establish electrical connection between the base portion 11_4 and the light-emitting element(s) 20, in a top view, the region where the wiring region(s) 14 of the base portion 11_4 protrudes from the submount 30_4 can be kept small, thereby contributing to a reduction in the size of the light emitting device 101.

The electrically conductive member 75 may also function as a bonding member to bond to the base portion 11_4 and to the submount 30_4, in fixing the submount 30_4 to the mounting surface 11M of the base portion 11_4. The electrically conductive member(s) 75 can improve the bonding strength between the base portion 11_4 and the submount 30_4.

As illustrated in FIG. 21, in the light emitting device 101 according to the present embodiment, the thickness w1 of a lateral wall portion 12 of the package 10 along the X axis direction may be not less than 350 μm and not more than 450 μm. The interspace w2 between the first lateral face 30a and the second lateral face 30b of the submount 30_4 along the X axis direction may be not less than 100 μm and not more than 200 μm. The interspace w3 between the lateral wall portion 12 of the package 10 and the first lateral face 30a of the submount 30 along the X axis direction may be not less than 50 μm and not more than 100 μm. The size W4 of each electrically conductive member 75 along the X axis direction may be not less than 200 μm and not more than 450 μm. The gap w5 for electrical insulation between each electrically conductive member 75 and the bonding member 35 along the X axis direction may be not less than 50 μm and not more than 200 μm. The size W6 of the concavity aperture of each recess 30s along the X axis direction may be not less than 150 μm and not more than 400 μm. The thickness t1 of the second submount 32 included in the submount 30_4 along the Y axis direction may be not less than 100 μm and not more than 400 μm. The height t2 of each electrically conductive member 75 along the Y axis direction may be about not less than 150 μm and about not more than 450 μm.

Hereinafter, an example method for manufacturing the light emitting device 101 according to the present embodiment will be described.

The example method for manufacturing the light emitting device 101 includes: forming one or more recesses 30s at the outer periphery of the upper face of the submount 30_4 (Step 1); forming wiring regions 34 on the upper face 30c of the submount 30_4 (Step 2); forming wiring regions 14 on the mounting surface 11M of the base portion 11 (Step 3); applying a paste material to the mounting surface 11M of the base portion 11 and/or the lower face 30d of the submount 30_4 (Step 4); sintering the paste material to form a bonding layer between the mounting surface 11M of the base portion 11 and the lower face 30d of the submount 30_4, thereby bonding the submount 30_4 to the mounting surface 11M of the base portion 11 (Step 5); and sintering an electrically conductive paste material to form one or more electrically conductive members 75 that are in contact with the one or more recesses 30s formed at the outer periphery of the upper face 30c of the submount 30_4, thereby establishing electrical connection between the wiring regions 34 formed on the upper face 30c of the submount 30_4 and the wiring regions 14 formed on the mounting surface 11M of the base portion 11 (Step 6).

At Step 4 above, a metal paste such as gold paste can be used as the paste material, for example. At Step 5 above, an example range of sintering temperature is not lower than 200° C. but lower than 300° C. For example, by sintering the metal particles contained in the paste material for about 30 minutes in this temperature range, a bonding layer can be formed between the mounting surface 11M of the base portion 11 and the lower face 30d of the submount 30_4. At Step 6 above, an example range of sintering temperature is not lower than 200° C. but lower than 300° C. For example, by sintering the metal particles contained in the electrically conductive paste material for about 30 minutes in this temperature range, one or more electrically conductive members 75 can be formed. As the materials of the bonding material and the electrically conductive member(s) 75, materials with an appropriate bonding temperature should be selected such that any bonding that has been created in the preceding steps will not be ruined.

Third Embodiment

A light emitting device 102 according to a third embodiment differs from the light emitting device 100 or 101 according to the first or second embodiment in that concavities are provided in lateral faces of a submount 30_5 that does not have a step structure. Hereinafter, differences from the light emitting device 100 or 101 according to the first or second embodiment will mainly be described.

Figure 22:
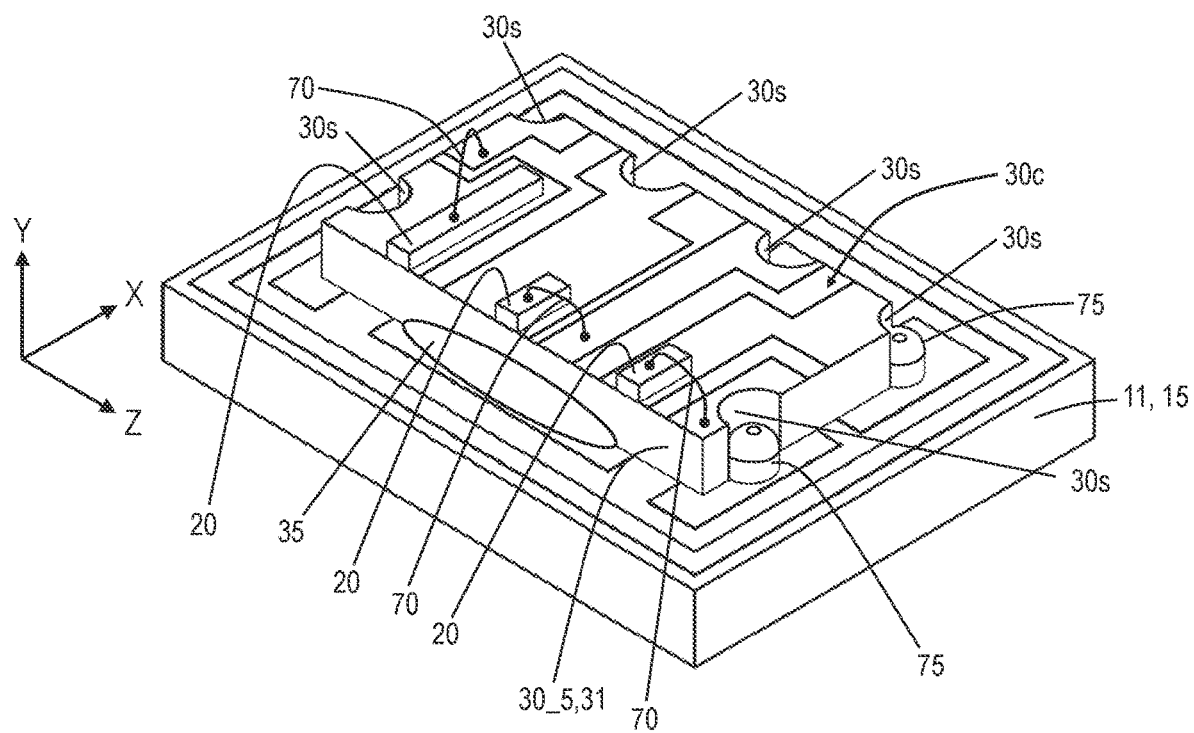
FIG. 22 is a perspective view of the light emitting device according to a third embodiment of the present disclosure, from which a cap of a package is omitted.

FIG. 22 is a perspective view of the light emitting device 102, from which a cap 16 of a package 10 is omitted. Note that a perspective view of the light emitting device 102 is as presented in FIG. 1.

The light emitting device 102 includes: at least one light-emitting element 20; a submount 30_5 having an upper face 30c on which light-emitting elements 20 are disposed; a base portion 11 having a mounting surface 11M to which the submount 30_5 is fixed; and one or more electrically conductive members electrically connecting the submount 30_5 and the base portion 11. The submount 30_5 has one or more recesses 30s. Each electrically conductive member 75 is in contact with the mounting surface 11M of the base portion 11 and a recess 30s in the submount 30_5. In a top view, the one or more recesses 30s form concavities at the outer periphery of the upper face 30c of the submount 30_5.

Unlike in any of the submounts described above, the submount 30_5 is not structured so as to have upper-level lateral faces 30x and lower-level lateral faces 30y. Except for a different thickness, the shape of the submount 30_5 is identical to the shape of the first submount 31 according to the second embodiment. Therefore, regarding the description concerning the submount 30_4 according to the second embodiment, any content that is specific to the first submount 31 itself also applies to the submount 30_5. However, since the submount 30_5 lacks a portion corresponding to the second submount 32, any description of the first submount 31 that is stated in conjunction with the second submount 32 does not apply.

In the submount 30_5, the bonding material that bonds the submount 30_5 to the base portion 11 protrudes from the first face, but does not protrude from the third faces or the fourth faces. For example, by providing grooves in the upper face of the base portion 11 in the region between the bonding region 14a and the third faces and in the region between the bonding region 14a and the fourth faces, it can be ensured that the bonding material will not protrude from the third faces or the fourth faces. In the one or more recesses 30s of the submount 30_5, an electrically conductive member(s) 75 is bonded, such that the electrically conductive member(s) 75 is not in contact with the bonding member 35. Similarly to the aforementioned light emitting device 100 and light emitting device 101, the light emitting device 102 also realizes a small light emitting device.

Certain embodiments of the present invention have been described above, but light emitting devices according to the present invention are not limited to those of the described embodiments. In other words, the present invention is achievable without being limited to the outer shapes or structures of the light emitting devices disclosed in the embodiments. The present invention is applicable without necessarily and fully including all of the disclosed constituent elements. For example, in the event that a certain component of a light emitting device included in any of the disclosed embodiments is not recited in the claims, the claimed invention may still be applicable in view of the design flexibility of a person of ordinary skill in the art for such a component through the use of an alternative, an omission, a shape change, a change in the materials employed, or the like.

Light emitting devices according to embodiments can be used for head-mounted displays, projectors, lightings, displays, and the like.

What is claimed is:

1. A light emitting device comprising:
   at least one semiconductor laser element having an exiting lateral surface through which laser light is emitted;
   a submount having an upper face on which the at least one semiconductor laser element is disposed; and
   a base portion having a mounting surface to which the submount is fixed;
   wherein:
   the submount comprises:
      a first lateral face located at a side of the exiting lateral surface of the at least one semiconductor laser element, the first lateral face intersecting the upper face, and the first lateral face being above and separated from the mounting surface,
      a lower face bonded to the mounting surface of the base portion, the lower face being set back inside of the submount relative to an edge at which the upper face and the first lateral face intersect in a top view as viewed from a direction normal to the upper face, and
      a second lateral face located at the same side as the first lateral face and intersecting the lower face;

a bonding material forms a bonding layer between the mounting surface of the base portion and the lower face of the submount; and in the top view:

a portion of the bonding material protrudes from the lower face and extends outward of an edge at which the lower face and the second lateral face intersect, and the bonding material extends outward of a first edge of the upper face of the submount and does not extend outward from a second edge of the upper face of the submount that is opposite the first side.

2. The light emitting device of claim 1, wherein the portion of the bonding material protruding from the lower face is in contact with the second lateral face and has a height greater than that of the bonding layer.

3. The light emitting device of claim 1, wherein an angle between the second lateral face and the lower face is greater than 90° but not greater than 100°.

4. The light emitting device of claim 1, wherein the second lateral face does not intersect the first lateral face.

5. The light emitting device of claim 1, wherein an area of the upper face of the submount is greater than an area of the lower face of the submount, and, in the top view, the lower face is encompassed within the upper face.

6. The light emitting device of claim 3, wherein:

the submount comprises a first submount and a second submount that are bonded together, the first submount comprising the upper face and the first lateral face, and the second submount comprising the lower face and the second lateral face; and in the top view, the second submount is encompassed within the first submount.

7. The light emitting device of claim 1, wherein the exiting lateral surface is located between (i) an imaginary plane passing through the edge at which the lower face and the second lateral face intersect and being perpendicular to the mounting surface, and (ii) an imaginary plane passing through the edge at which the upper face and the first lateral face intersect and being perpendicular to the mounting surface.

8. The light emitting device of claim 1, wherein, in the top view, the exiting lateral surface protrudes from the upper face of the submount.

9. The light emitting device of claim 1, wherein, in the top view, the portion of the bonding material protruding from the lower face of the submount extends outward of the upper face of the submount.

10. The light emitting device of claim 1, further comprising:

one or more electrically conductive members electrically connecting the submount and the base portion; wherein:

the submount includes one or more recesses; and each electrically conductive member is in contact with the mounting surface of the base portion and a respective recess in the submount.

11. The light emitting device of claim 10, wherein, in the top view, the one or more recesses define one or more concavities at an outer periphery of the upper face of the submount.

12. The light emitting device of claim 1, wherein the at least one semiconductor laser element comprises a first semiconductor laser element configured to emit first light having an emission peak at a first wavelength, a second semiconductor laser element configured to emit second light having an emission peak at a second wavelength that is different from the first wavelength, and a third semiconductor laser element configured to emit third light having an emission peak at a third wavelength that is different from the first wavelength and the second wavelength.

13. The light emitting device of claim 11, wherein:

the at least one semiconductor laser element comprises a first semiconductor laser element, a second semiconductor laser element, and a third semiconductor laser element disposed between the first semiconductor laser element and the second semiconductor laser element;

the one or more recesses comprise a recess located in each of two lateral faces intersecting the first lateral face and a recess in a lateral face that is opposite to the first lateral face; and the first semiconductor laser element and the second semiconductor laser element are electrically connected to the electrically conductive members that are in contact with the recesses respectively located in the two lateral faces intersecting the first lateral face, and the third semiconductor laser element is electrically connected to the electrically conductive member that is in contact with the recess located in the lateral face that is opposite to the first lateral face.

14. The light emitting device of claim 1, further comprising:

a cap having a lateral wall portion and being fixed to the mounting surface of the base portion; wherein:

the at least one semiconductor laser element and the submount are disposed inside the cap; and the laser light emitted from the at least one semiconductor laser element is transmitted through the lateral wall portion so as to be emitted outside the cap.

15. The light emitting device of claim 14, wherein an interspace from the lateral wall portion to the first lateral face of the submount is not less than 50 μm and not more than 100 μm.

16. A light emitting device comprising:

at least one semiconductor laser element having an exiting lateral surface through which laser light is emitted;

a submount having an upper face on which the at least one semiconductor laser element is disposed;

a base portion having a mounting surface to which the submount is fixed; and one or more electrically conductive members electrically connecting the submount and the base portion; wherein:

the submount comprises:

a first lateral face located at a side of the exiting lateral surface of the at least one semiconductor laser element, the first lateral face intersecting the upper face, and the first lateral face being above and separated from the mounting surface, a lower face bonded to the mounting surface of the base portion, the lower face being set back inside of the submount relative to an edge at which the upper face and the first lateral face intersect in a top view as viewed from a direction normal to the upper face, and a second lateral face located at the same side as the first lateral face and intersecting the lower face;

a bonding material forms a bonding layer between the mounting surface of the base portion and the lower face of the submount; and a portion of the bonding material protrudes from the lower face and extends outward of an edge at which the lower face and the second lateral face intersect;

the submount includes one or more recesses;

each electrically conductive member is in contact with the mounting surface of the base portion and a respective recess in the submount;

in the top view, the one or more recesses define one or more concavities at an outer periphery of the upper face of the submount;

the at least one semiconductor laser element comprises a first semiconductor laser element, a second semiconductor laser element, and a third semiconductor laser element disposed between the first semiconductor laser element and the second semiconductor laser element;

the one or more recesses comprise a recess located in each of two lateral faces intersecting the first lateral face and a recess in a lateral face that is opposite to the first lateral face; and the first semiconductor laser element and the second semiconductor laser element are electrically connected to the electrically conductive members that are in contact with the recesses respectively located in the two lateral faces intersecting the first lateral face, and the third semiconductor laser element is electrically connected to the electrically conductive member that is in contact with the recess located in the lateral face that is opposite to the first lateral face.

\* \* \* \* \*